(12) United States Patent
Wente et al.

(10) Patent No.: US 12,534,294 B2
(45) Date of Patent: Jan. 27, 2026

(54) PUMP CONTROL SYSTEM FOR A REFUSE VEHICLE

(71) Applicant: Oshkosh Corporation, Oshkosh, WI (US)

(72) Inventors: Derek Wente, Oshkosh, WI (US); Jacob Wallin, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 460 days.

(21) Appl. No.: 18/143,545

(22) Filed: May 4, 2023

(65) Prior Publication Data

US 2023/0356937 A1    Nov. 9, 2023

Related U.S. Application Data

(60) Provisional application No. 63/338,589, filed on May 5, 2022.

(51) Int. Cl.
| | | |
|---|---|---|
| *B65F 3/06* | (2006.01) | |
| *F04C 18/107* | (2006.01) | |
| *F04C 28/08* | (2006.01) | |
| *F15B 15/02* | (2006.01) | |
| *B65F 3/02* | (2006.01) | |

(52) U.S. Cl.
CPC .............. *B65F 3/06* (2013.01); *F04C 18/107* (2013.01); *F04C 28/08* (2013.01); *F15B 15/02* (2013.01); *B65F 2003/0269* (2013.01); *B65F 2003/0279* (2013.01); *F04C 2240/40* (2013.01)

(58) Field of Classification Search
CPC .................................... B65F 3/06; B65F 3/10
See application file for complete search history.

(56) References Cited

U.S. PATENT DOCUMENTS

| | | | |
|---|---|---|---|
| 9,145,905 B2 * | 9/2015 | Hou | B65F 3/06 |
| 9,494,170 B2 * | 11/2016 | Hou | F15B 11/0423 |
| 10,703,356 B2 * | 7/2020 | Lacroix | B60W 10/11 |
| 11,059,436 B2 * | 7/2021 | Wildgrube | B65F 3/041 |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0398670 A1 | 12/2020 | Rocholl et al. | |
| 2020/0398695 A1 | 12/2020 | Rocholl et al. | |

(Continued)

*Primary Examiner* — Jonathan Snelting
(74) *Attorney, Agent, or Firm* — Foley & Lardner LLP

(57) ABSTRACT

A refuse vehicle includes a chassis, a body, a lift system, and a controller. The lift system includes a lift arm actuator, a pump, and an electric motor. The pump is configured to power the lift arm actuator and is driven by the electric motor. The controller is configured to receive a user input that specifies a position of the lift arm actuator within a movement range, determine a flow demand required to move the lift arm actuator to the position, determine a motor speed that satisfies the flow demand, and communicate the motor speed to the electric motor.

20 Claims, 16 Drawing Sheets

(56) References Cited

U.S. PATENT DOCUMENTS

| | | |
|---|---|---|
| 2020/0398697 A1 | 12/2020 | Rocholl et al. |
| 2020/0399057 A1 | 12/2020 | Rocholl et al. |
| 2021/0031611 A1 | 2/2021 | Yakes et al. |
| 2021/0031612 A1 | 2/2021 | Yakes et al. |
| 2021/0221216 A1 | 7/2021 | Yakes et al. |
| 2021/0229908 A1 | 7/2021 | Rocholl et al. |
| 2021/0252995 A1 | 8/2021 | Rocholl et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0324880 A1 | 10/2021 | Wente et al. |
| 2021/0339632 A1 | 11/2021 | Rocholl et al. |
| 2021/0339648 A1 | 11/2021 | Koga et al. |
| 2021/0396251 A1 | 12/2021 | Clifton et al. |
| 2022/0009338 A1 | 1/2022 | Yakes et al. |
| 2022/0096884 A1 | 3/2022 | Koga et al. |
| 2022/0097527 A1 | 3/2022 | Koga et al. |
| 2022/0097555 A1 | 3/2022 | Koga et al. |
| 2022/0097556 A1 | 3/2022 | Koga et al. |
| 2022/0097633 A1 | 3/2022 | Koga et al. |
| 2022/0097961 A1 | 3/2022 | Koga et al. |
| 2022/0097962 A1 | 3/2022 | Koga et al. |
| 2022/0097963 A1 | 3/2022 | Koga et al. |
| 2022/0097964 A1 | 3/2022 | Koga et al. |
| 2022/0099723 A1 | 3/2022 | Koga et al. |
| 2022/0105827 A1 | 4/2022 | Rocholl et al. |
| 2022/0169444 A1 | 6/2022 | Rocholl et al. |
| 2022/0185582 A1 | 6/2022 | Koga et al. |
| 2022/0219896 A1 | 7/2022 | Gary et al. |
| 2022/0258965 A1 | 8/2022 | Kappers et al. |
| 2022/0258967 A1 | 8/2022 | Kappers et al. |
| 2022/0267090 A1 | 8/2022 | Rocholl et al. |
| 2022/0307312 A1 | 9/2022 | Rocholl et al. |
| 2022/0340359 A1 | 10/2022 | Rocholl et al. |
| 2023/0039772 A1 | 2/2023 | Rocholl et al. |
| 2023/0039974 A1 | 2/2023 | Rocholl et al. |
| 2023/0042649 A1 | 2/2023 | Koga et al. |
| 2023/0045720 A1 | 2/2023 | Rocholl et al. |
| 2023/0047275 A1 | 2/2023 | Rocholl et al. |
| 2023/0053238 A1 | 2/2023 | Koga et al. |
| 2023/0089417 A1 | 3/2023 | Koga et al. |
| 2023/0117427 A1 | 4/2023 | Turner et al. |
| 2023/0120042 A1 | 4/2023 | Turner et al. |
| 2023/0125077 A1 | 4/2023 | Gary et al. |
| 2023/0173945 A1 | 6/2023 | Rocholl et al. |
| 2023/0202301 A1 | 6/2023 | Rocholl et al. |
| 2023/0202340 A1 | 6/2023 | Koga et al. |

* cited by examiner

PUMP CONTROL SYSTEM FOR A REFUSE VEHICLE

CROSS-REFERENCE TO RELATED PATENT APPLICATIONS

This application claims the benefit of and priority to U.S. Provisional Application No. 63/338,589, filed May 5, 2022, the entire contents of which is incorporated by reference herein.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One exemplary embodiment relates to a refuse vehicle. The refuse vehicle includes a chassis, a body, a lift system, a first pump, and a controller. The body is coupled to the chassis and defies a collection chamber configured to receive refuse. The lift system is coupled to the body and includes a lift arm actuator, a first pump configured to power the lift arm actuator, and a first electric motor coupled to the first pump and configured to drive the first pump. The controller is communicably coupled to the first electric motor and is configured to receive a first user input that specifies a first position of the lift arm actuator within a first movement range, determine a first flow demand required to move the lift arm actuator to the first position based on the first user input, determine a first motor speed of the first electric motor that satisfies the first flow demand, and communicate the first motor speed to the first electric motor.

Another exemplary embodiment relates to a control system for a refuse vehicle. The control system includes a first pump, a first electric motor, a first hydraulic subsystem, and a controller. The first pump is configured to produce a pressurized fluid. The first electric motor is coupled to the first pump and is configured to drive the first pump. The first hydraulic subsystem is fluidly coupled to the first pump and includes a first actuator having a first movement range. The controller is communicably coupled to the electric motor and is configured to receive a first user input that specifies a first position of the first actuator within the first movement range, determine a first flow demand required to move the first actuator to the first position based on the first user input, determine a first motor speed of the electric motor that satisfies the first flow demand, and communicate the first motor speed to the first electric motor.

Still another embodiment relates to a method for controlling a hydraulic system of a refuse vehicle. The method includes receiving a first user input that specifies a first position of a lift arm actuator of a refuse vehicle within a first movement range, determining a first flow demand required to move the lift arm actuator to the first position based on the first user input, determining a first motor speed of a first electric motor coupled to a first pump and configured to drive the first pump that satisfies the first flow demand, and communicating the first motor speed to the first electric motor.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
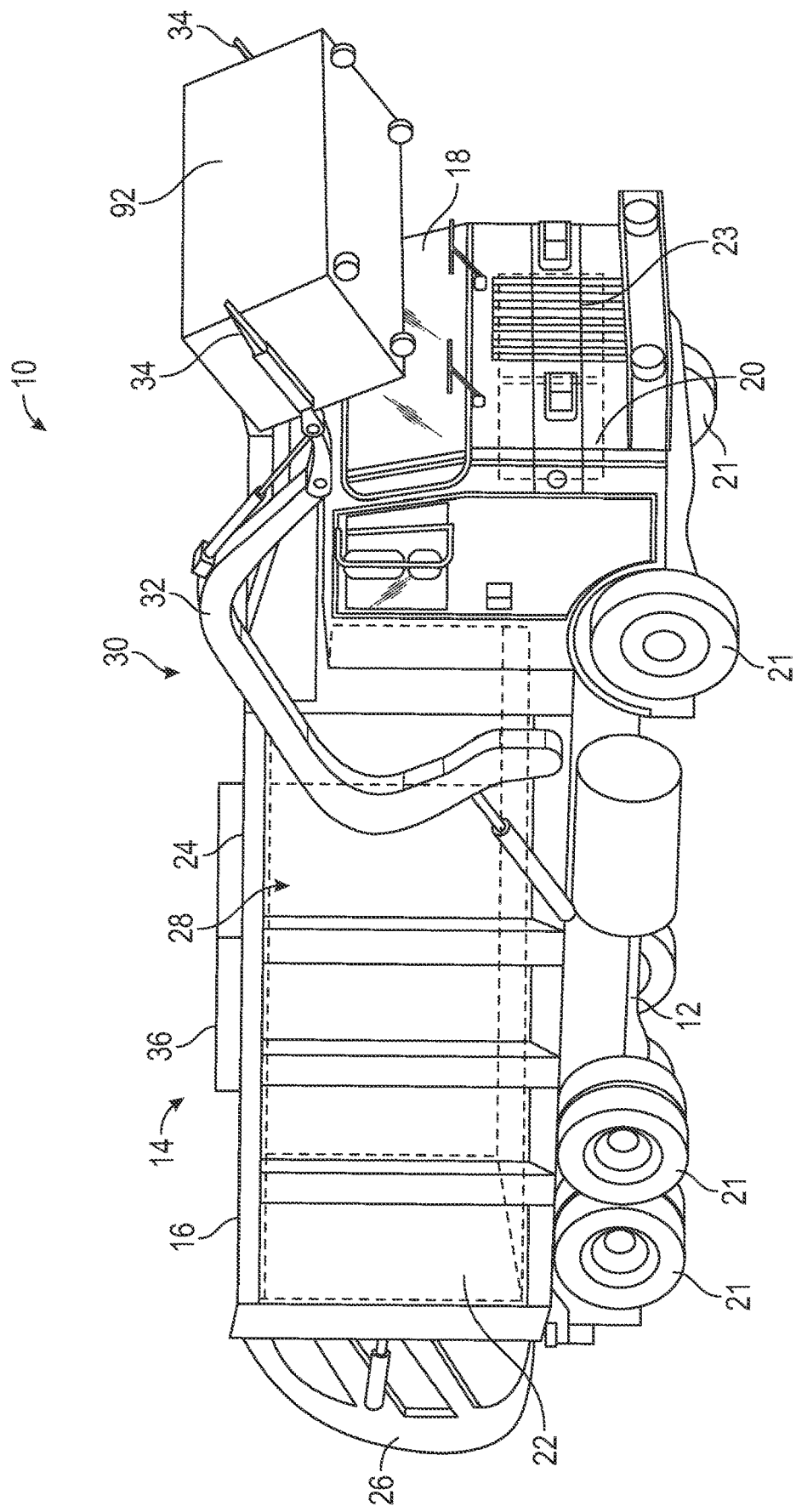
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for controlling an electric refuse vehicle. The electric refuse vehicles can be defined as zero emission refuse (EZR) vehicles. Electric refuse vehicles, or E-refuse vehicles, include an onboard energy storage device, like a battery, that provides power to a motor that produces rotational power to drive the vehicle. The energy storage device, which is typically a battery or series of batteries, can be used to provide power to different subsystems on the E-refuse vehicle as well. The energy storage device is also configured to provide hydraulic power to different subsystems on the E-refuse vehicle through an electric power take-off (E-PTO) device. The E-PTO receives electric power from the energy storage device and provides the electric power to an electric motor. The electric motor drives a helical gear pump that provides pressurized hydraulic fluid to different vehicle subsystems, including the compactor and the lifting system.

The E-refuse vehicle includes a manual power disconnect to selectively couple the E-PTO to the energy storage device. The manual power disconnect allows a user to decouple the E-PTO from the energy storage device, which can be advantageous for a variety of reasons. For example, when a refuse route has been completed and the lifting system and compactor no longer need to be operated, a user can discontinue power transfer between the energy storage device and the E-PTO to limit the total energy use of the vehicle. Similarly, if the energy storage device is low, a user can disconnect the E-PTO to limit the electric power draw from the energy storage device so that the remaining battery life can be used exclusively to drive the vehicle. Similarly, if maintenance is being performed on the E-refuse vehicle, the manual power disconnect can allow the E-PTO to be locked out so that unwanted incidental operation is prevented and avoided.

Referring to FIGS. 1-3 and 11, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries, ultra-capacitors, etc.), from an on-board generator (e.g., an internal combustion engine), or from an external power source (e.g., overhead power lines) and provide power to the systems of the refuse vehicle 10.

The refuse vehicle 10 may be defined as a zero emission refuse (EZR) truck. That is, the refuse truck may not include an exhaust system and thus prevents the output of exhaust. Instead, the refuse vehicle 10 is mobile via the prime mover 20 that is supplied power from the electric motors. Additionally or alternatively, accessory systems of the refuse vehicle 10 may be electrified to substantially eliminate the use of combustible fuel in the refuse vehicle 10.

Figure 2:
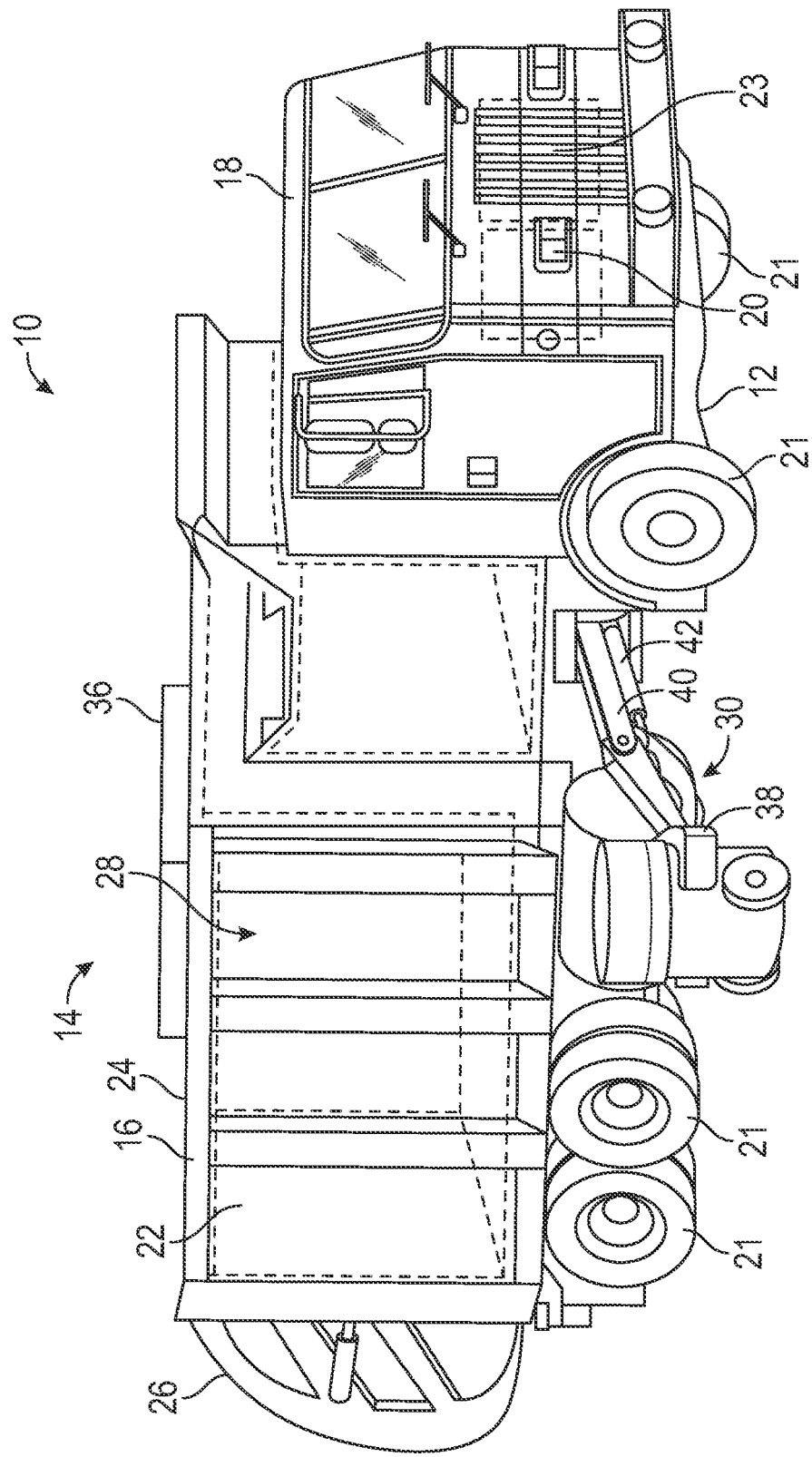
FIG. 2 is a perspective view of a side loading refuse vehicle according to an exemplary embodiment.
Figure 3:
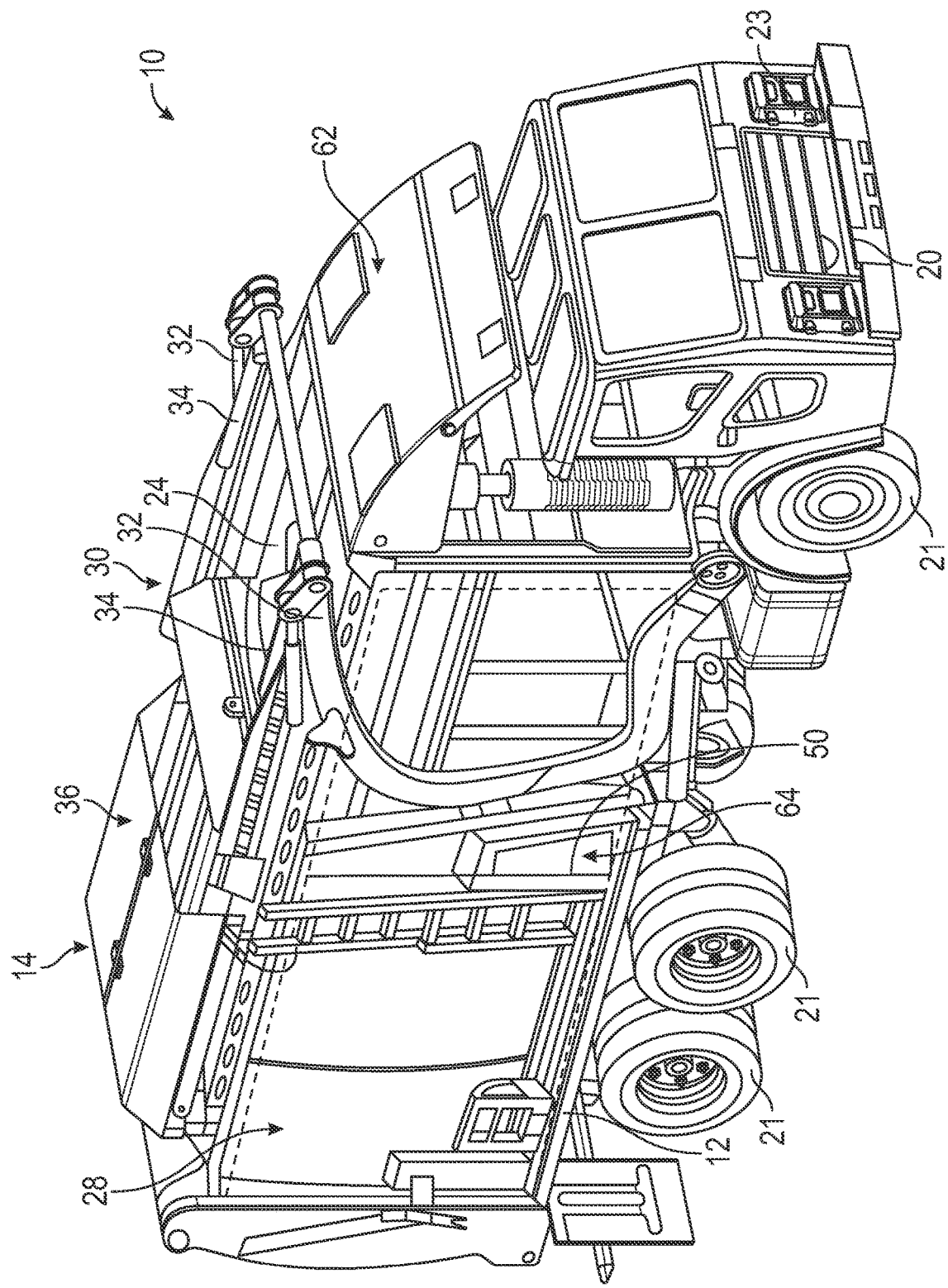
FIG. 3 is a front perspective view of an electric front loading refuse vehicle according to an exemplary embodiment.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 (e.g., a canopy or a lip) extend over or in front of a portion of the cab 18. According to the embodiment shown in FIGS. 1-3, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse vehicle 10).

Referring again to the exemplary embodiment shown in FIG. 1, the refuse vehicle 10 is a front-loading refuse vehicle. As shown in FIG. 1, the refuse vehicle 10 includes a lift system 30 that includes a pair of arms 32 coupled to the frame 12 on either side of the cab 18. The arms 32 may be rotatably coupled to the frame 12 with a pivot (e.g., a lug, a shaft, etc.). In some embodiments, a first actuator (e.g., a hydraulic cylinder, etc.) is coupled to the frame 12 and the arms 32, and extension of the actuator rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. A second actuator (e.g., a hydraulic cylinder, a carriage actuator, etc.) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42, a lift arm actuator, etc.) articulates the arm 40 and positions the grabber 38 to interface with the refuse container. The arm 40 may be movable within one or more directions (e.g., up and down, left and right, in and out, rotationally clockwise or counterclockwise, etc.) to facilitate positioning the grabber 38 to interface with the refuse container. According to an alternative embodiment, the grabber 38 is movably coupled to the body 14 with a track. After interfacing with the refuse container (e.g. with a finger actuator, etc.), the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse vehicle 10 is a front loading E-refuse vehicle. Like the refuse vehicle 10 shown in FIG. 1, the E-refuse vehicle includes a lift system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container 92, etc.). During operation of the refuse vehicle 10, the forks 34 are positioned to engage the refuse container (e.g., the refuse vehicle 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse vehicle 10 includes one or more energy storage devices, shown as battery assembly 23. The battery assembly 23 can be rechargeable lithium-ion batteries, for example. The battery assembly 23 is configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The battery assembly 23 can supply additional subsystems on the refuse vehicle 10, including additional electric motors, cab controls (e.g., climate controls, steering, lights, etc.), lift systems, and/or compactors, for example.

Figure 4:
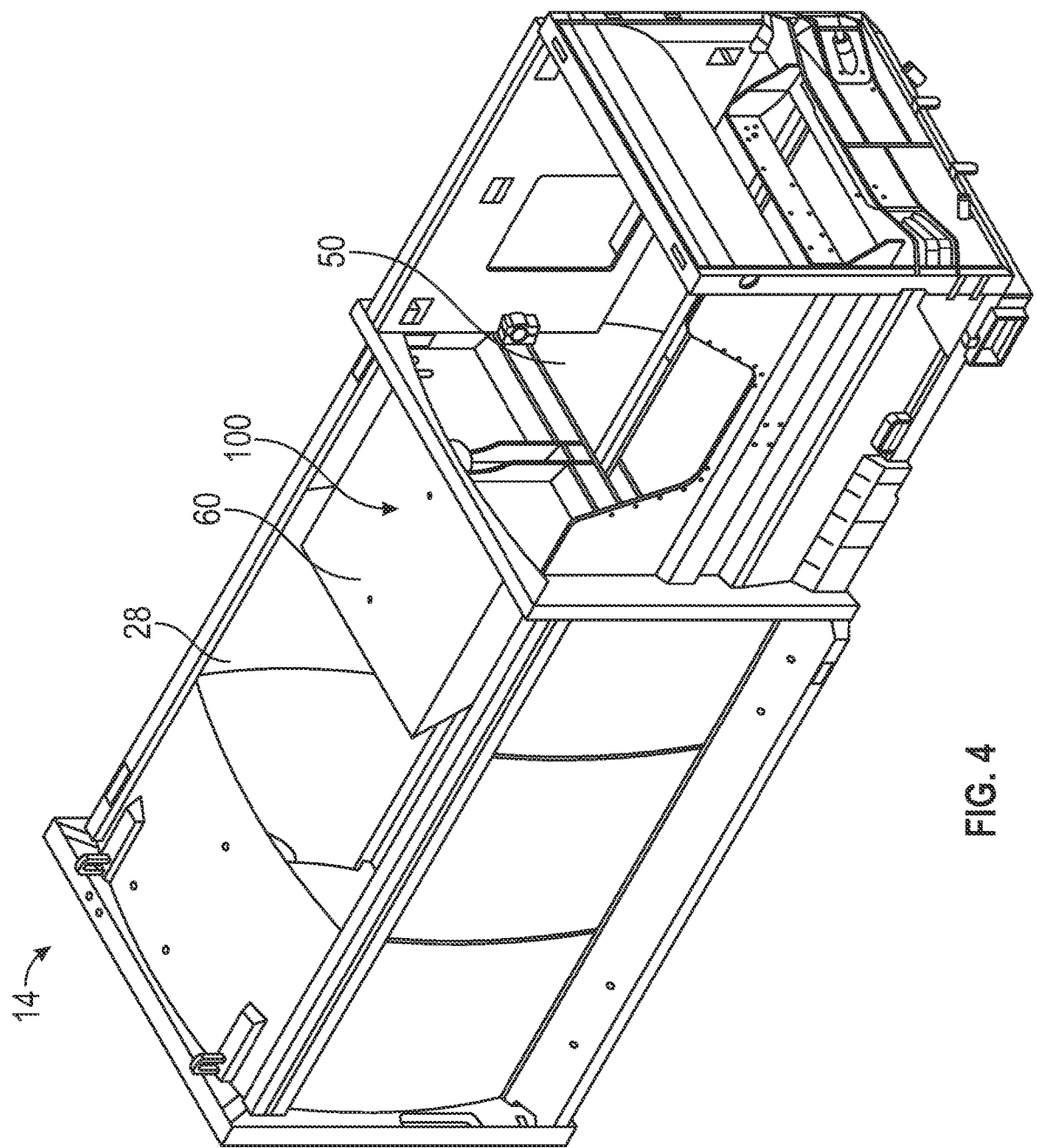
FIG. 4 is a top perspective view of a body assembly of the refuse vehicle of FIG. 3, according to an exemplary embodiment.
Figure 5:
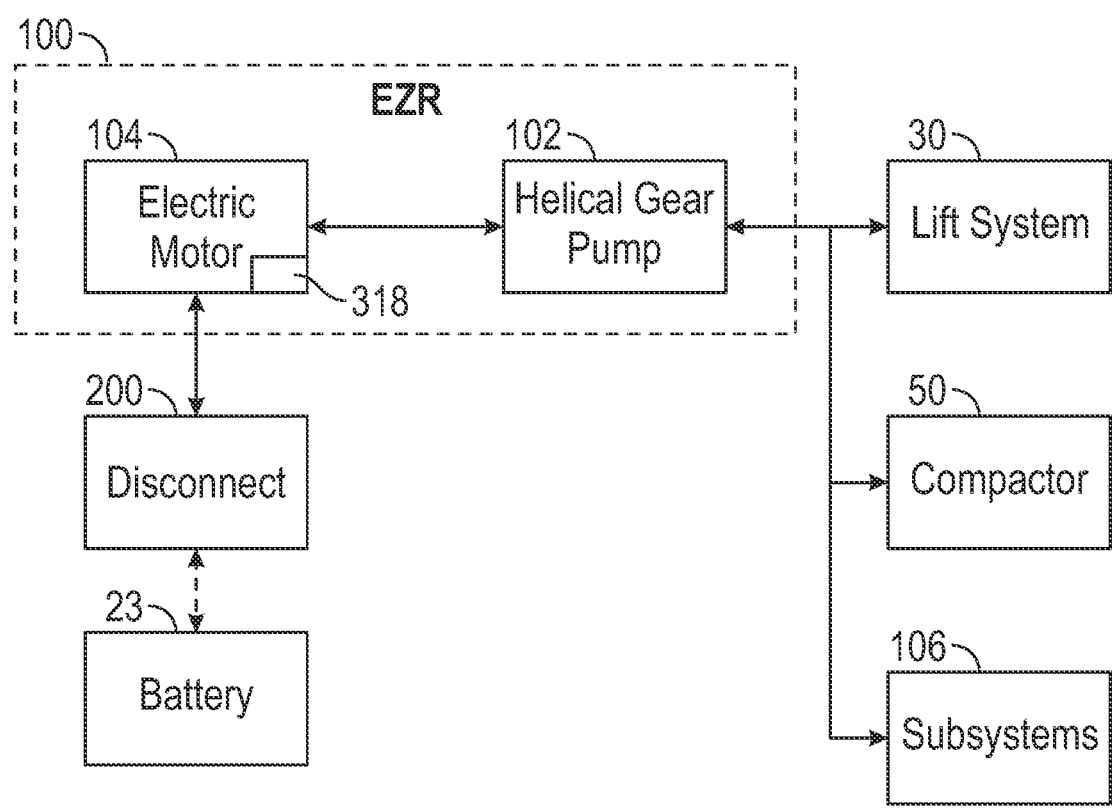
FIG. 5 is a schematic view of a control system of the refuse vehicle of FIG. 3.

The refuse vehicle 10 can be considered a hybrid refuse vehicle because it includes both electric and hydraulic power systems. As depicted in FIGS. 3-5, the refuse vehicle 10 includes an E-PTO system 100. The E-PTO system 100 is configured to receive electrical power from the battery assembly 23 and convert the electrical power to hydraulic power. In some examples, the E-PTO system 100 includes a first electric motor, shown as electric motor 104, driving a first pump, shown as helical gear pump 102. In some examples, the E-PTO system 100 includes a second electric motor driving a second pump. In some examples, the electric motor 104 drives multiple helical gear pumps 102. The helical gear pump 102 pressurizes fluid from a fluid reservoir onboard the refuse vehicle 10, which can then be supplied to various hydraulic cylinders and actuators present on the refuse vehicle 10. For example, the helical gear pump 102 can provide hydraulic fluid to each of the hydraulic cylinders within the lift system 30 on the refuse vehicle 10. Additionally or alternatively, the helical gear pump 102 can provide pressurized fluid to a hydraulic cylinder controlling the compactor 50 (e.g., a compactor actuator, etc.). In still further embodiments, the helical gear pump 102 provides pressurized fluid to the hydraulic cylinders that control a position and orientation of the tailgate 26. The E-PTO system 100 can be positioned about the refuse vehicle 10 in various different places. For example, the E-PTO system 100 may be positioned within a housing 60 above or within the on-board receptacle 16 (see FIG. 4), beneath a canopy 62 extending over a portion of the cab 18, or within a cabinet housing 64 alongside the body 14. Although the E-PTO system 100 may be in electrical communication with the battery assembly 23, the E-PTO system 100 can be separate from and spaced apart from the frame 12.

With continued reference to FIG. 5, the refuse vehicle 10 includes a disconnect 200 positioned between the battery assembly 23 and the e-PTO system 100. The disconnect 200 provides selective electrical communication between the battery assembly 23 and the E-PTO system 100 that can allow the secondary vehicle systems (e.g., the lift system, compactor, etc.) to be decoupled and de-energized from the electrical power source. The disconnect 200 can create an open circuit between the battery assembly 23 and the E-PTO system 100, such that no electricity is supplied from the battery assembly 23 to the electric motor 104. Without electrical power from the battery assembly 23, the electric motor 104 will not drive the helical gear pump(s) 102. Pressure within the hydraulic system will gradually decrease, such that none of the first hydraulic subsystem, shown as lift system 30, the second hydraulic subsystem, shown as compactor 50, or other hydraulic subsystems, shown as vehicle subsystems 106, relying upon hydraulic power will be functional. The refuse vehicle 10 can then be operated in a lower power consumption mode, given the reduced electrical load required from the battery assembly 23 to operate the refuse vehicle 10. The disconnect 200 further enables the refuse vehicle 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain operational even when the E-PTO system 100 is not receiving electrical power from the battery assembly 23.

Figure 6:
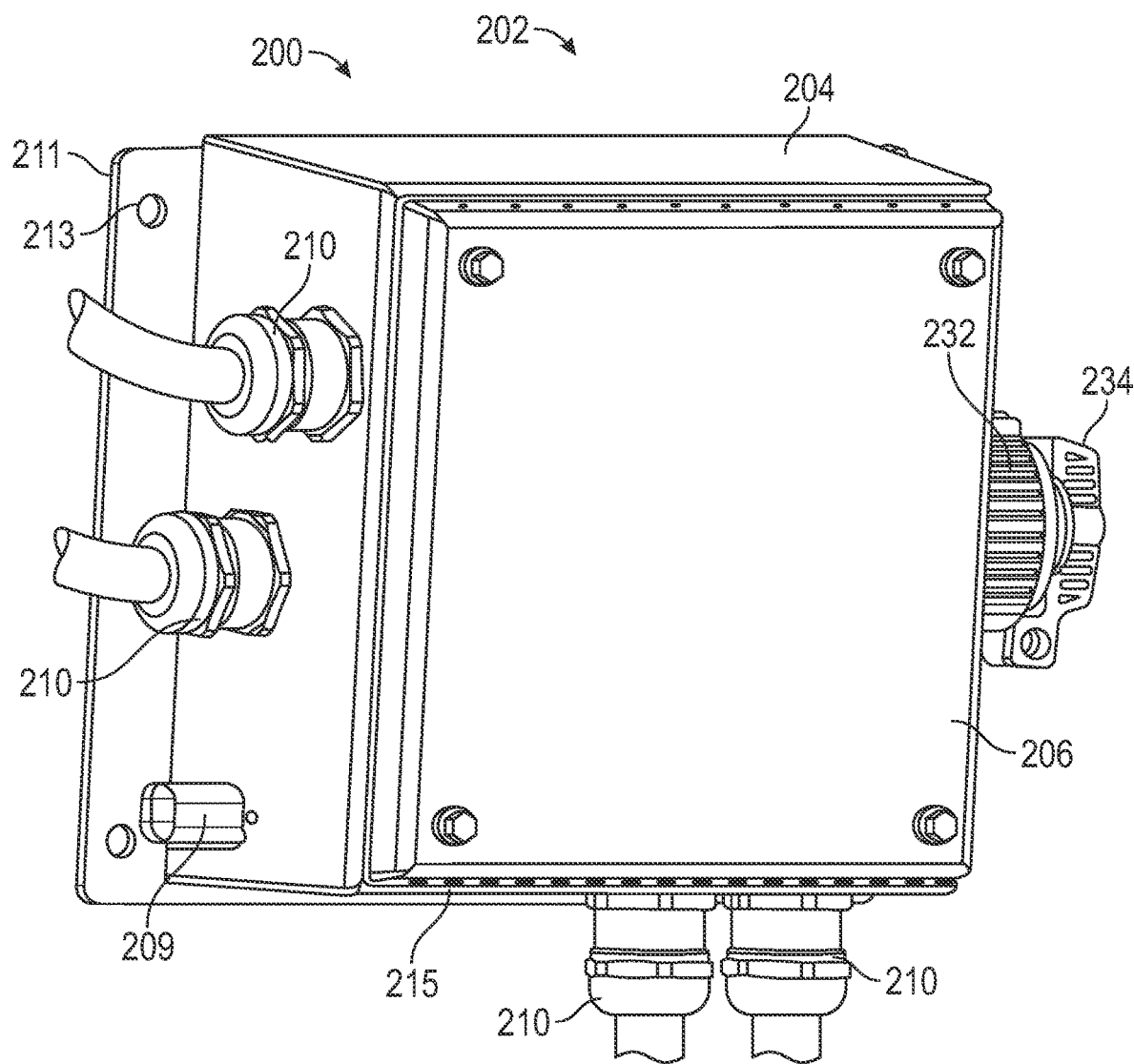
FIG. 6 is a perspective view of an electric power control box included within the control system of FIG. 5 and the refuse vehicle of FIG. 3.
Figure 7:
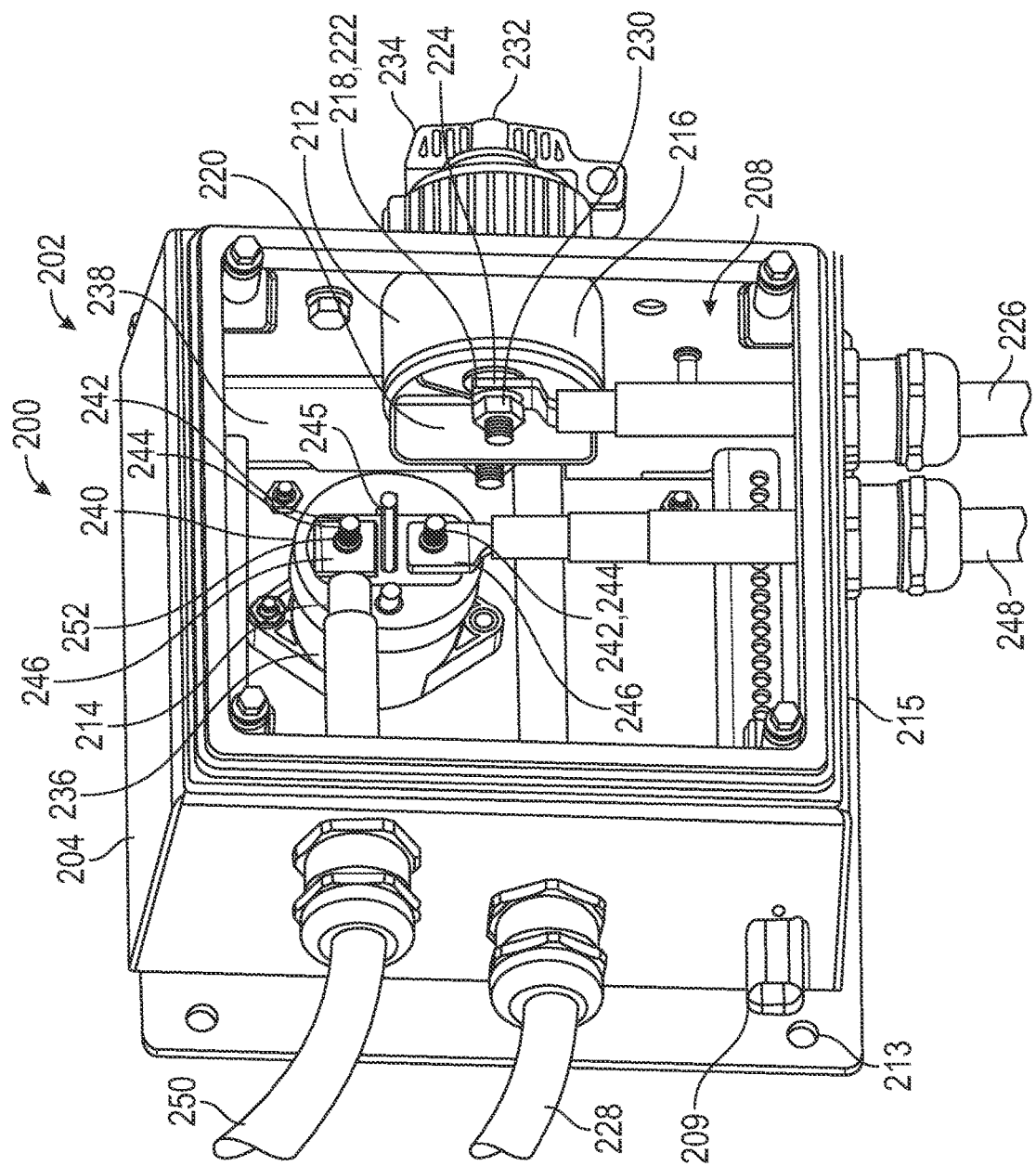
FIG. 7 is a perspective view of the electric power control box of FIG. 6 with a cover of the electric power control box removed.

FIGS. 6-7 depict an electric power control box 202 that can function as the disconnect 200. The electric power control box 202 generally includes a housing 204 and a cover or door 206 that together define a waterproof cavity 208. The waterproof cavity 208 receives and supports electrical connections between the E-PTO system 100 and the battery assembly 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse vehicle 10. In some examples, the housing 204 is positioned within the cabinet housing 64 formed alongside the body 14. As depicted in FIGS. 6-7, the housing 204 includes a mounting flange 211 extending around at least a portion of the housing 204. The mounting flange 211 includes a plurality of mounting holes 213 that can be used to fasten the housing 204 to the body 14 of the refuse vehicle 10. In some examples, a vent 215 is formed within an underside of the housing 204 to allow cooling air to enter into the cavity 208.

Figure 8:
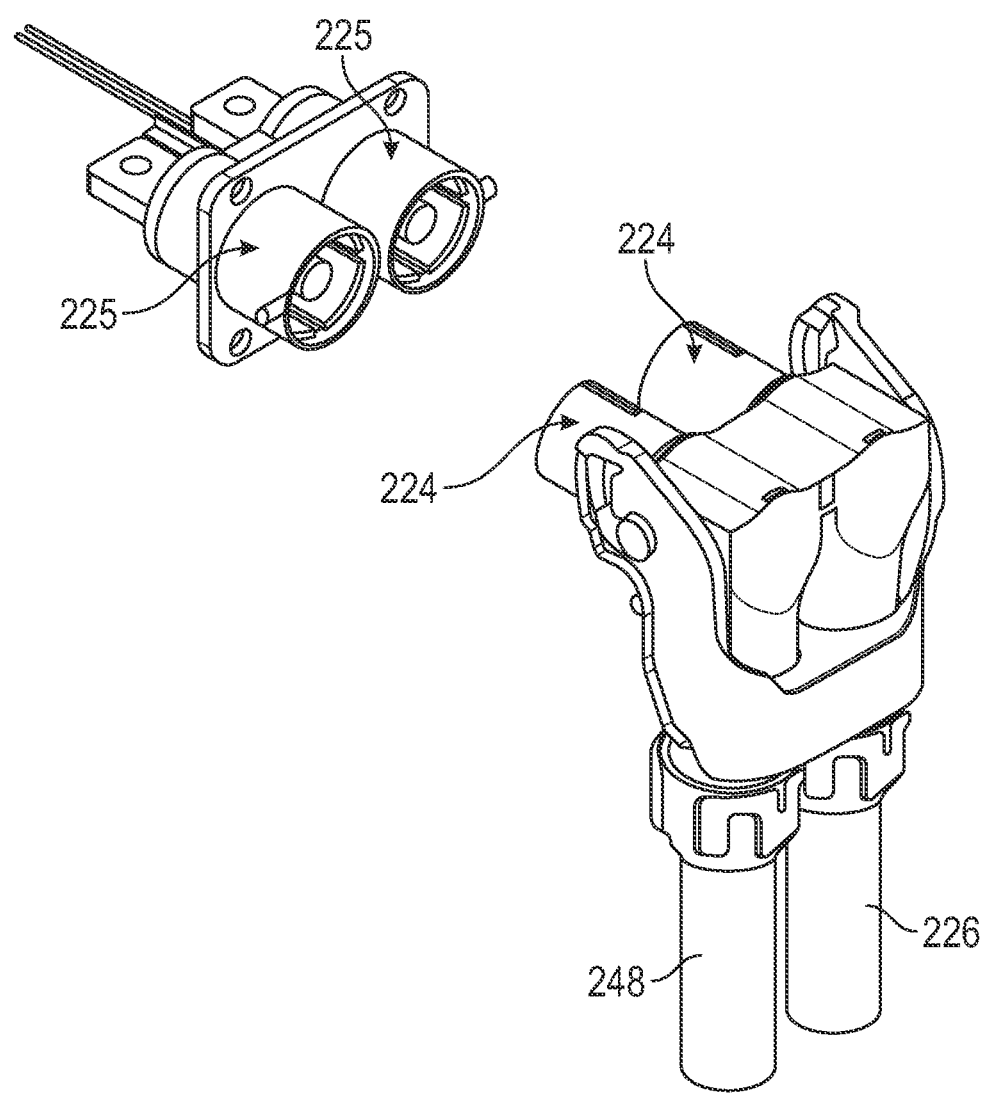
FIG. 8 is a perspective view of a plug that can be used within the electric power control box of FIG. 6.

The electric power control box 202 provides a positive terminal connection, shown as positive terminal bus 212, and a negative terminal connection, shown as negative terminal bus 214, to create an electrical coupling between the E-PTO system 100 and the battery assembly 23. As depicted in FIG. 7, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted in FIG. 8, etc.). For example, one of the threaded shanks 222 can receive the connector 224 that is coupled to a high voltage positive shielded cable 226 that is coupled to the battery assembly 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 7, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a divider wall 245. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 8, etc.) As depicted in FIG. 7, one of the threaded shanks 244 receives a connector 246 that is coupled to a high voltage negative shielded cable 248 that is coupled to the battery assembly 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 245 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 8. The connector 224 can be plugged into female terminals 225 formed in the positive terminal bus 212 while the connector 246 can be plugged into female terminals 247 formed in the negative terminal bus 214.

Figure 9:
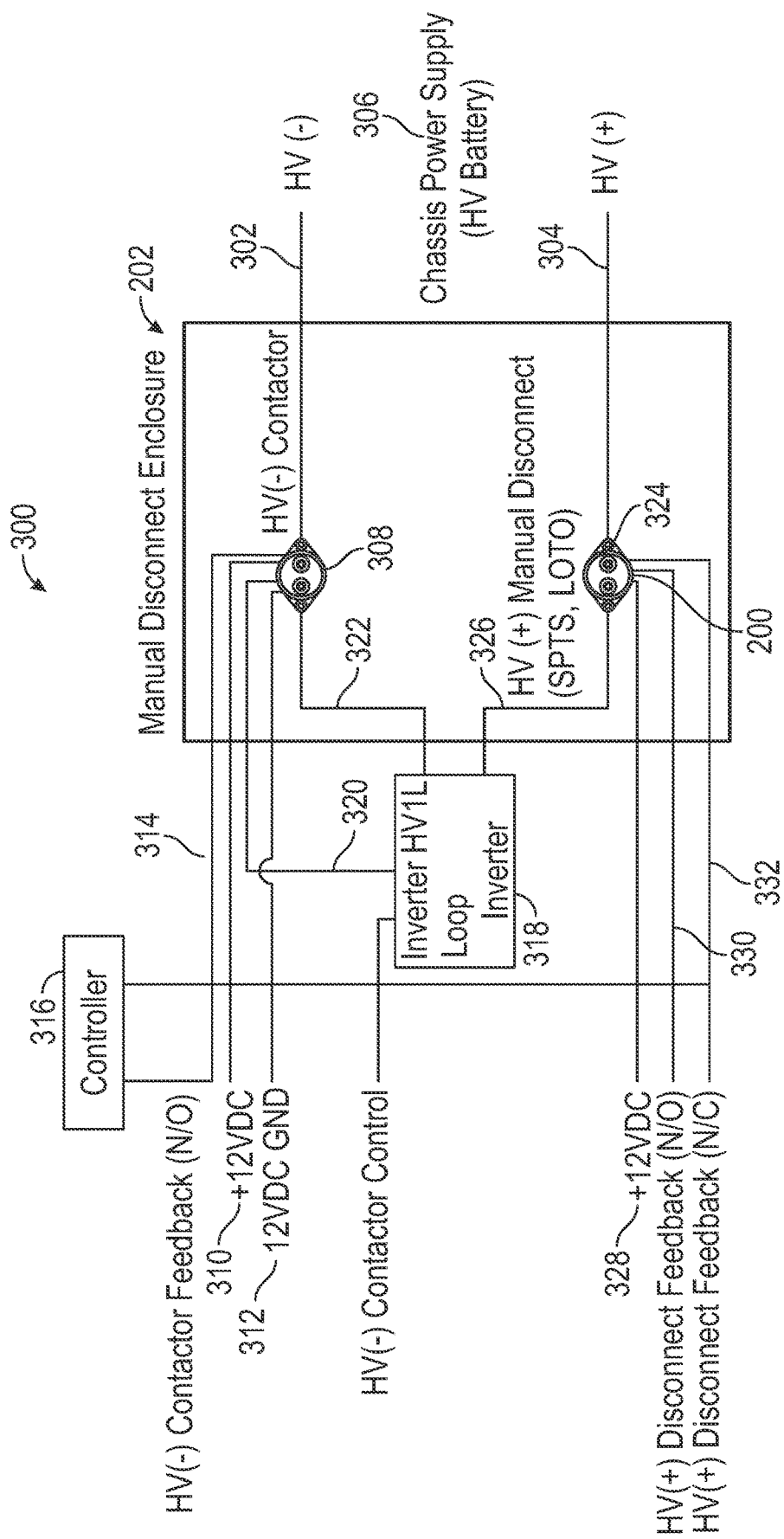
FIG. 9 is a schematic view of a circuit that can be used in and by the electric power control box of FIG. 6.
Figure 10:
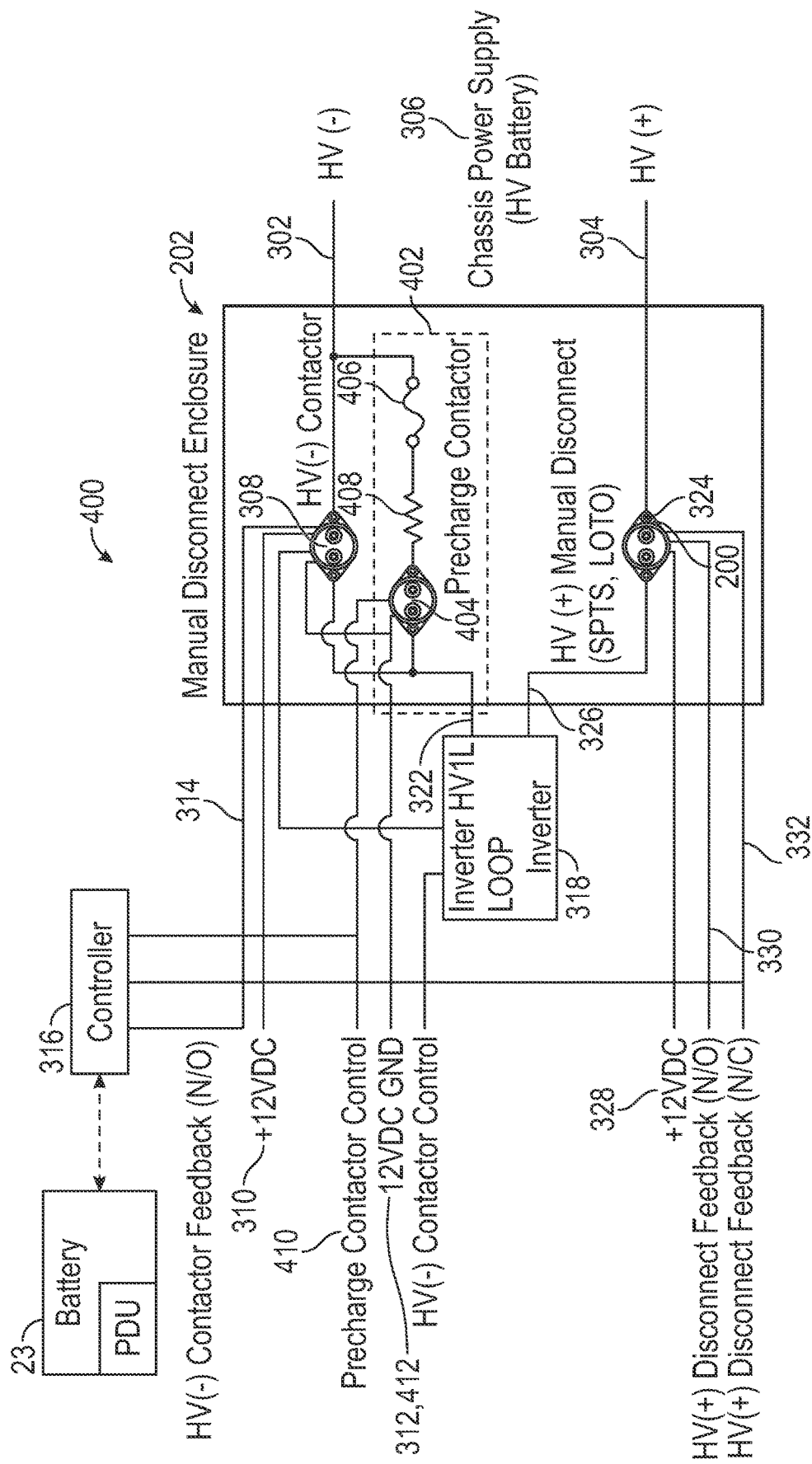
FIG. 10 is a schematic view of an alternative circuit that can be used in and by the electric power control box of FIG. 6.

With additional reference to FIGS. 9-10, the operation of the electric power control box 202 and disconnect 200 is described in additional detail with reference to the circuit 300. As depicted in FIG. 10, the electric power control box 202 includes high voltage inputs 302, 304 coming from the chassis battery power supply 306. The high voltage inputs 302, 304 can be the negative shielded cable 248 and the positive shielded cable 226, for example, that extend away from and supply electrical power from the battery assembly 23 (which can constitute the chassis battery power supply 306).

The high voltage input 302 is coupled to a negative high voltage contactor 308. In some examples, the negative terminal bus 214 serves as the negative high voltage contactor 308. The negative high voltage contactor 308 is electrically coupled to an auxiliary low voltage source 310 and to ground 312. In some examples, the auxiliary low voltage source 310 is a 12 V battery that is configured to toggle a contactor switch within the negative high voltage contactor 308 between an open position and a closed position. In the open position, the terminals 242 of the negative terminal bus 214 are electrically decoupled and in the closed position, the terminals 242 of the negative terminal bus 214 are electrically coupled to one another through the contactor switch. A negative contactor feedback line 314 coupled to a controller 316 can monitor and/or control the operation of the contactor switch. The negative contactor feedback line 314 can detect a welded contactor at system startup, and is configured to open immediately if a high voltage cable (e.g., high voltage outputs 322, 326) is unplugged from an inverter 318 of the E-PTO system 100. In some examples, the inverter 318 of the E-PTO system 100 is coupled to the negative high voltage contactor 308 using a wire 320. The wire 320 can be used to ground the inverter 318. A high voltage output 322, such as the negative shielded cable 250, is also coupled to the other terminal on the negative high voltage contactor 308. Accordingly, when the contactor switch is closed, electrical power can be transmitted from the high voltage input 302, through the negative high voltage contactor 308, and to the high voltage output 322. The high voltage output 322 can provide direct current (DC) power to the inverter 318, where it is inverted into alternating current (AC) power for use by the electric motor 104 or with additional components on the vehicle (e.g., vehicle lights, climate control systems, sensors, displays, cab controls, or other auxiliary systems within the refuse truck, etc.).

The high voltage input 304 is coupled to a positive high voltage contactor 324 that also serves as a manual disconnect. For example, the positive high voltage contactor 324 can be the positive terminal bus 212 shown and described with respect to FIGS. 6-7. The positive high voltage contactor 324 includes terminals (e.g., terminals 218) that receive the high voltage input 304 and a high voltage output 326. The high voltage input 304 can be the positive shielded cable 226 while the positive high voltage output 326 can be the positive shielded cable 228, for example. The positive high voltage output 326 is coupled to the inverter 318 so that DC electrical power is supplied from the battery assembly 23, through the positive high voltage contactor 324, to the inverter 318, which then transforms the DC power to AC power for use by the electric motor 104. A second auxiliary power source 328 can also be coupled to the positive high voltage contactor 324. The second auxiliary power source 328 can be a 12 V battery, for example. In some examples, the second auxiliary power source 328 is in communication with the controller 316 and is configured to receive instructions from the controller 316 to control a contactor switch within the positive high voltage contactor 324. The positive high voltage contactor 324 can also include one or more disconnect feedback lines 330, 332 that can monitor the status of the positive high voltage contactor 324 to provide information to one or more of the E-PTO system 100, the battery assembly 23, or the controller 316, for example. In some examples, the disconnect feedback lines 330, 332 are coupled to the disconnect 200 and are wired to a common power source (e.g., the second auxiliary power source 328). When the disconnect 200 is closed, the first disconnect feedback line 330 will have 12 V while the second disconnect feedback line 332 will have 0 V. When the disconnect 200 is opened, the first disconnect feedback line 330 will have 0 V and the second disconnect feedback line 332 will have 12 V. In some examples, the controller 316 provides a fault signal if both disconnect feedback lines 330, 332 carry the same voltage.

As indicated above, the positive high voltage contactor 324 includes a disconnect 200 that can manually open a contactor switch within the positive high voltage contactor 324 to decouple the terminals 218 and decouple the high voltage input 304 from the high voltage output 326. In some examples, the disconnect 200 is a single pole, single throw (SPST) switch that can be manually moved between an open position and a closed position. In the open position, the terminals 218 are decoupled from one another and electrical power cannot pass between the battery assembly 23 to the E-PTO system 100 through the high voltage input 304 and the high voltage output 326. In the closed position, the terminals 218 are electrically coupled and electrical power from the battery assembly 23 is supplied through the positive high voltage contactor 324 to the inverter 318 of the E-PTO system 100 to drive the electric motor 104. The disconnect 200 can be locked out in the open position, so that the E-PTO system 100 remains decoupled from the battery assembly 23 when maintenance is being performed, for example.

Referring now to FIG. 10, another circuit 400 that can be used to control and operate the disconnect 200 and the electric power control box 202 is depicted. The circuit 400 differs from the circuit 300 in that a pre-charge circuit 402 and pre-charge contactor 404 are included within the electric power control box 202. The pre-charge circuit 402 is in selective electrical communication with the high voltage input 302 and the high voltage output 322 using a switch 406. In some examples, the switch 406 is controlled by the controller 316. The pre-charge circuit 402 further includes a resistor 408 in series with the switch 406. In some examples, the pre-charge contactor 404 is grounded by the ground line 412. The high voltage output 322 is electrically coupled to the pre-charge contactor 404 as well, and is configured to be energized by the high voltage input 302. As explained below, the pre-charge circuit 402 is designed to prevent high inrush currents that could otherwise damage the wiring or electrical connections within the disconnect 200.

Each of the circuits 300, 400 are designed to form a reliable and efficient selective electrical coupling between the battery assembly 23 and the E-PTO system 100. The circuits 300, 400 are further designed to be integrated into the refuse vehicles 10 having different battery assembly 23 types or systems so that the E-PTO system 100 can be incorporated into the vehicle. The circuits 300, 400 further allow a user to lock out and disable the E-PTO system 100 without affecting the rest of the refuse vehicle 10 functions, so that the refuse vehicle 10 can still be driven or otherwise operated independent of the E-PTO system 100 function. This operational mode can be useful when power conservation is necessary, such as when the battery assembly 23 has limited remaining power.

The controller 316 can initiate electrical power transfer between the battery assembly 23 and the E-PTO system 100. In some examples, the controller 316 monitors the position of the disconnect 200. For example, the controller 316 can receive information from one or more of the disconnect feedback lines 330, 332 to determine whether the disconnect 200 is in the open or closed position. If the controller 316 determines that the disconnect 200 is open, the controller 316 can issue a command to open the contactor switch within the negative high voltage contactor 308. The auxiliary low voltage source 310 can then toggle the contactor switch open. In some examples, the controller 316 also communicates with the battery assembly 23 and associated circuit to open contactors associated with the battery assembly 23 to further isolate the battery assembly 23 from the E-PTO system 100. Similarly, the controller 316 can control the electric power control box 202 so that the contactor switch within the negative high voltage contactor 308 closes whenever the controller 316 determines that the disconnect 200 is closed.

The controller 316 communicates with the battery assembly 23 (e.g., to a power distribution unit (PDU) of the frame 12 in communication with the battery assembly 23) to initiate the transmission of electrical power from the battery assembly 23 to and through the electric power control box 202. In some examples, the controller 316 communicates a detected voltage at the inverter 318, which can indicate whether or not the disconnect 200 is open or closed. If the contactor switch within the negative high voltage contactor 308 is open, the controller 316 can communicate with the battery assembly 23 to ensure that the contactor switches associated with the battery assembly 23 are open as well. Accordingly, no high voltage will be provided from the battery assembly 23 to the electric power control box 202. If the controller 316 requests the contactors within the PDU of the battery assembly 23 to open, but confirmation that the contactors are open is not received by the controller 316, the controller 316 will prevent the negative high voltage contactor 308 and associated switch from closing. Closing the negative high voltage contactor 308 before pre-charging the negative high voltage contactor 308 could couple the battery assembly 23 to the electric power control box 202 in a way that might otherwise cause an inrush current that could weld the contactors or even blow a main fuse within the inverter 318. Accordingly, this condition is preferably avoided by the controller 316 and the electric power control box 202, more generally.

Similarly, the controller 316 communicates with the battery assembly 23 to indicate that the battery assembly 23 can be joined with the E-PTO system 100 through the inverter 318 and the electric power control box 202. The controller 316 monitors the status of the electric power control box 202. Upon detecting that the disconnect 200 has been closed and receiving confirmation that the contactors within the battery assembly 23 (e.g., the PDU) are open, the controller 316 closes the contactor within the negative high voltage contactor 308. The controller 316 then initiates a pre-charging process to provide an initial voltage on each of the high voltage input 302 and high voltage output 322. In some examples, the controller 316 controls the switch 406 to close, thereby closing the pre-charge circuit 402 and providing an initial voltage onto the high voltage input 302 and high voltage output 322. In some examples, the pre-charge circuit operates in conjunction with the auxiliary low voltage source 310, which can pass an initial charge at a lower voltage through to the inverter 318 to charge the capacitive elements within the inverter 318. Once the controller 316 detects that an appropriate pre-charge level has been reached within inverter 318 and along the high voltage input 302 and high voltage output 322, the controller 316 opens the switch 406 and closes the contactor switch within the negative high voltage contactor 308. The controller 316 then sends instructions to the battery assembly 23 or PDU to open the battery contactor switches, thereby providing electrical power from the battery assembly 23 to the E-PTO system. In some examples, the battery assembly 23 and PDU include a pre-charge circuit 402, such that the pre-charging operation can be left to the battery assembly 23.

Figure 11:
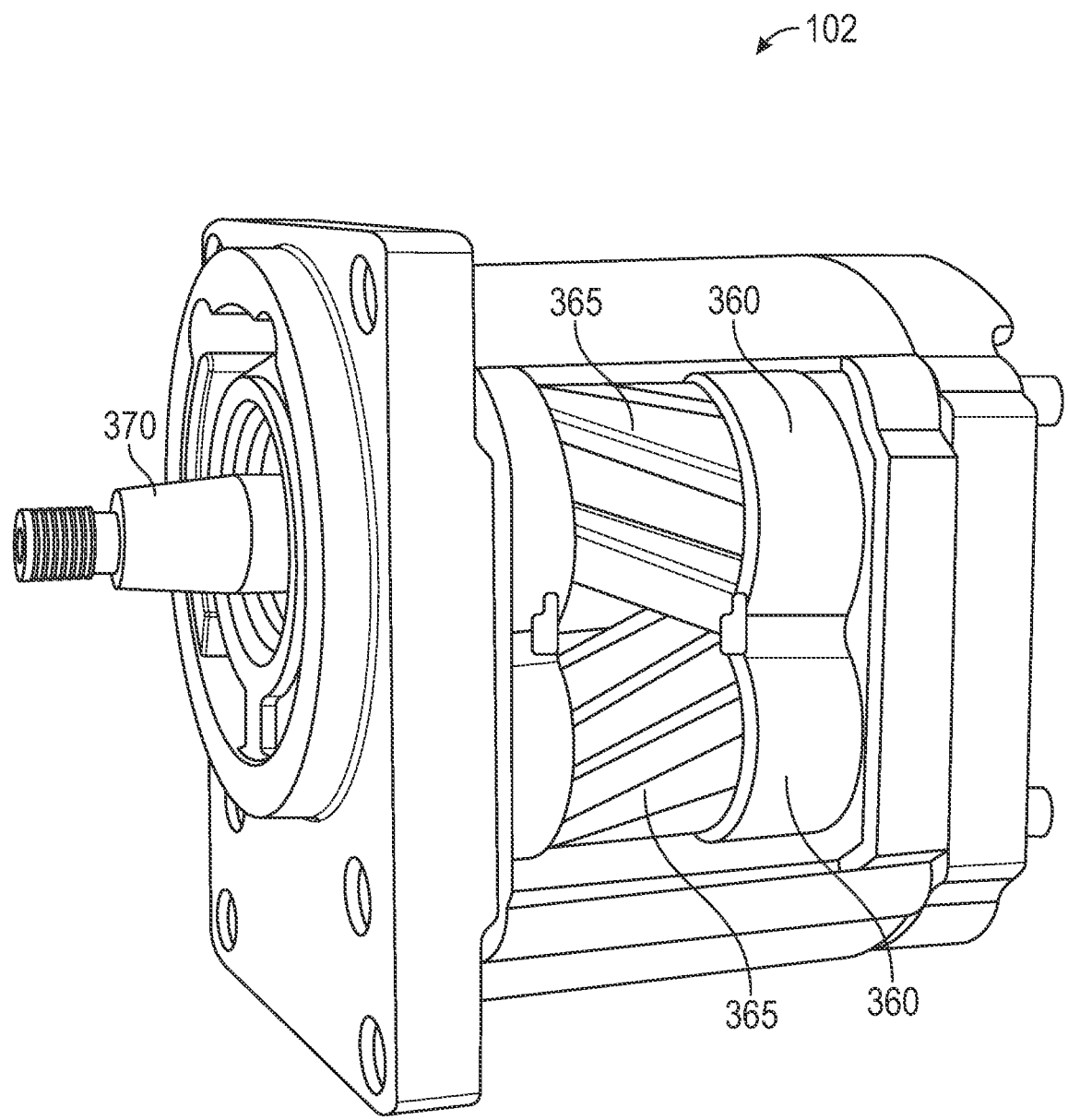
FIG. 11 is a detailed view of a helical gear pump that can be incorporated into any of the refuse vehicles of FIGS. 1-3.
Figure 12:
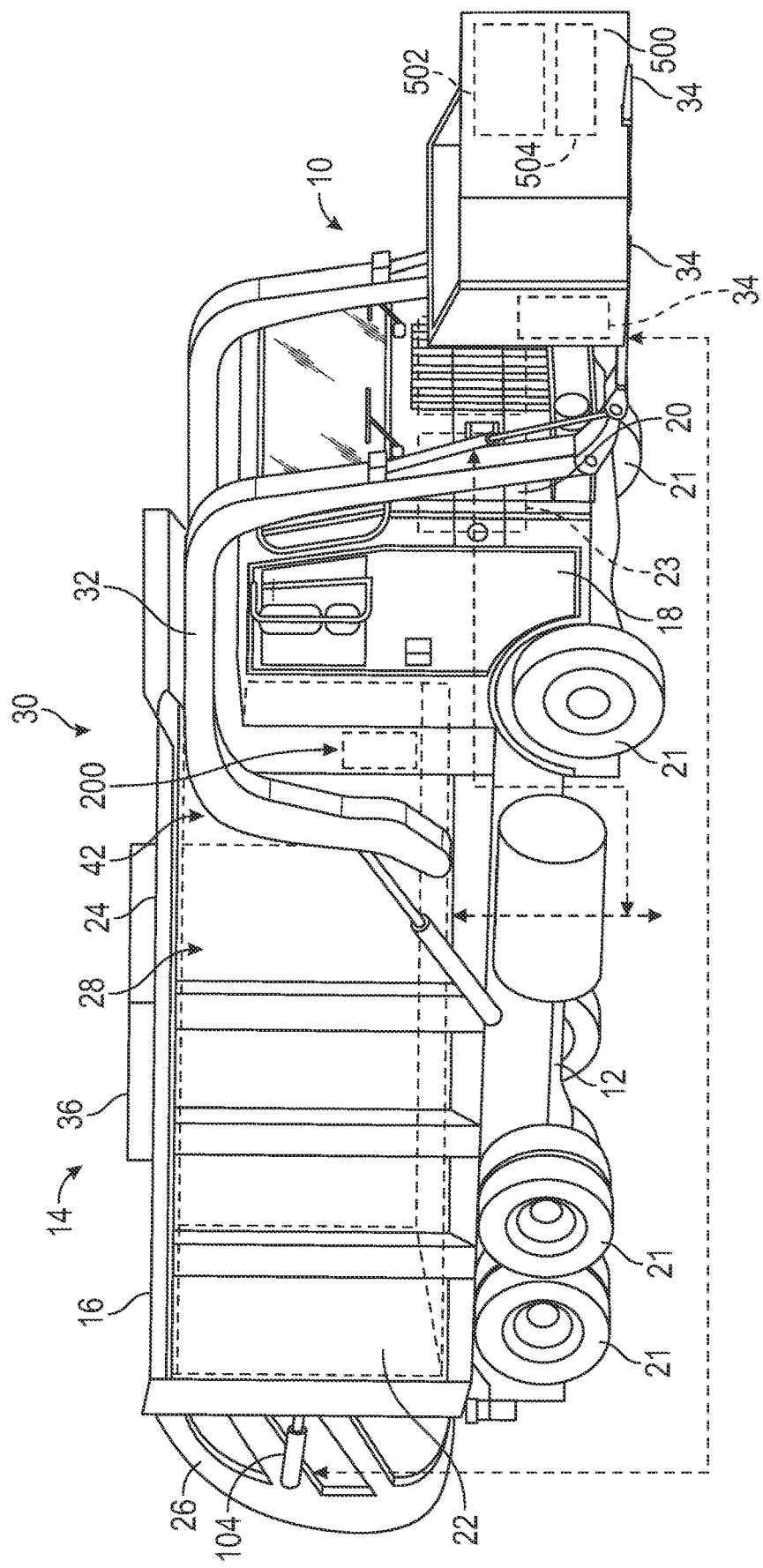
FIG. 12 is a perspective view of the front loading refuse vehicle of FIG. 1 coupled with a carry can device.

Referring now to FIG. 11, a detailed view of the helical gear pump 102 is shown. The helical gear pump 102 is configured to actuate at least one of the lift system 30 and the compactor 50. Additionally or alternatively, the helical gear pump 102 may be configured to actuate alternate components of the vehicle 10 (e.g., subsystems 106, etc.). For example, the helical gear pump 102 may be configured to actuate the lift arm between the extended position and the retracted position. In another example, the helical gear pump 102 may be configured to actuate the packer assembly between the open position and the closed position. The helical gear pump 102 may be coupled to the motor 104 via a shaft 370. The motor 104 may be positioned proximate a front of the body. In other embodiments, the motor 104 may be positioned distal the front of the body. The motor 104 may be mechanically coupled to the helical gear pump 102, where the motor drives rotation of one or more gears positioned therein.

The helical gear pump 102 may be defined as a medium pressure pump. The medium pressure pump may produce a fluid pressure within a range of 1000-10000 psi. In other embodiments, the medium pressure pump may produce a fluid pressure greater than 10000 psi or less than 1000 psi. Ideally, the helical gear pump 102 produces a fluid pressure between 2000 and 3000 psi. In still other embodiments, the helical gear pump 102 may be output a fluid pressure variable to the application, where the helical gear pump 102 may output increased pressurized fluid for applications that may require more. The helical gear pump 102 may include one or more helical gears, shown as helical gear 360. The helical gears 360 may be rotatably provided within the helical gear pump 102, where the helical gears 360 are configured to deliver a flow of pressurized fluid therethrough. The helical gear 360 includes one or more gear teeth 365 positioned around a circumference of the helical gear 360. The one or more gear teeth 365 are angularly provided about the helical gear 360. Advantageously, having the one or more gear teeth 365 angularly provided reduces the overall noise produced from the helical gears 360 coming in contact with one another. In other embodiments, the helical gear pump 102 may include other types of gears (e.g., spur, herringbone, etc.).

As can be appreciated, electric vehicles have mitigated a majority of noise produced from internal combustion engines. Advantageously, having the helical gear pump 102 equipped with helical gears 360 produces a low amount of pump noise. When the helical gear pump 102 is installed within an electric vehicle, the result is a vehicle producing an extremely low amount of noise. In some examples, the result may be a vehicle producing substantially zero noise.

Figure 13:
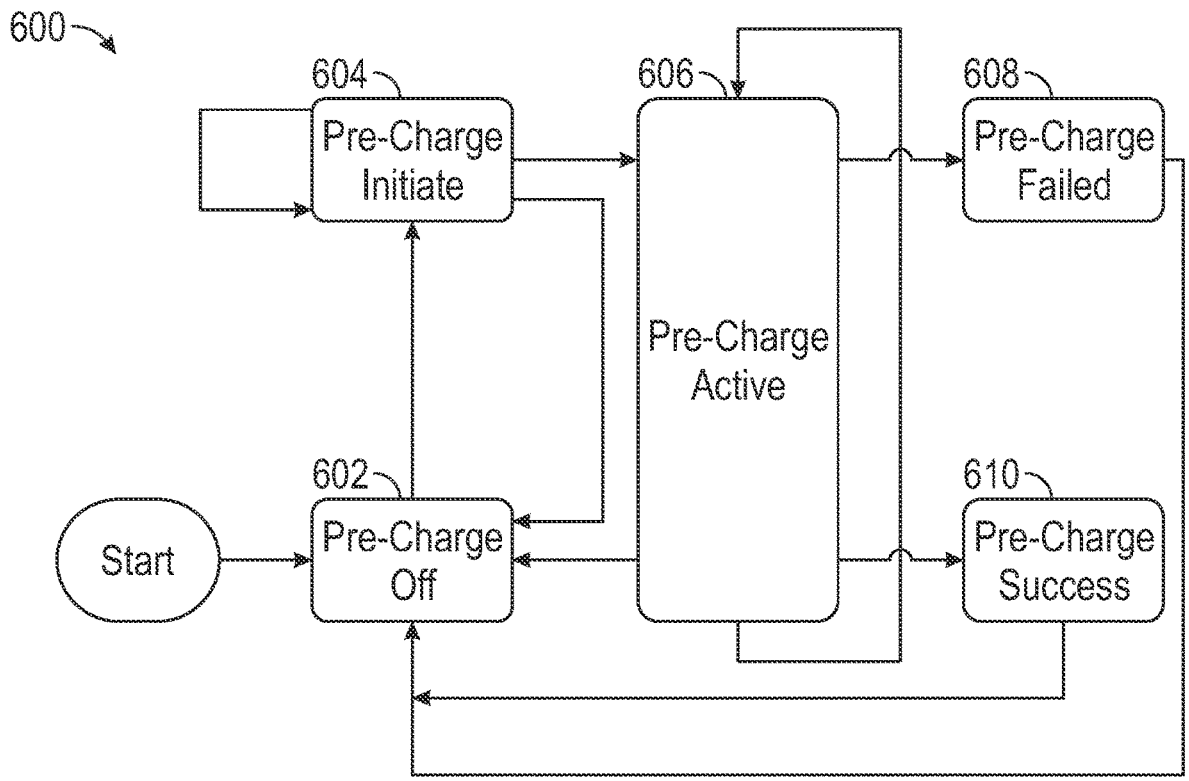
FIG. 13 is a flow chart depicting a method of operating a pre-charge circuit depicted in FIG. 11.
Figure 14:
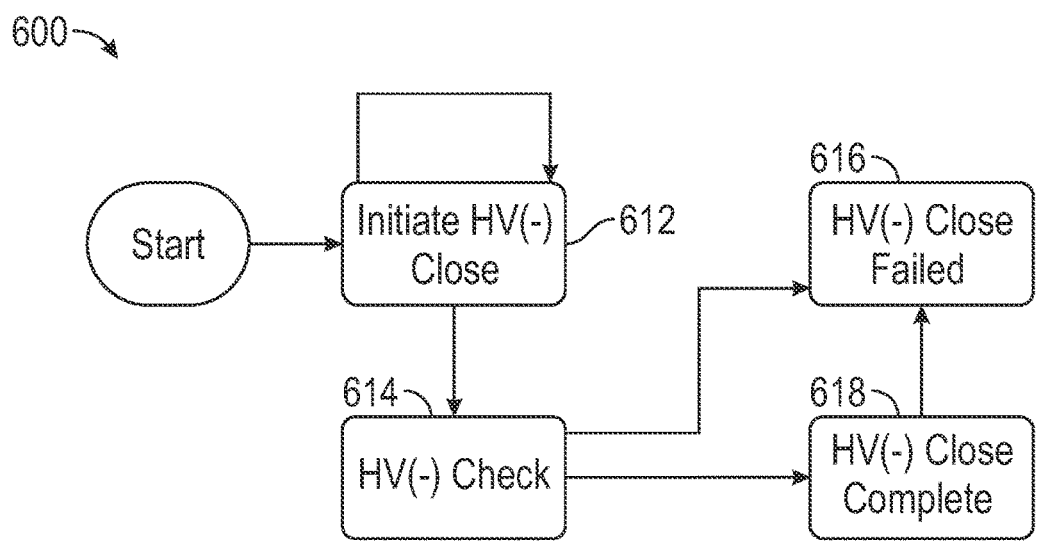
FIG. 14 is a flow chart depicting a method of operating the manual disconnect after performing a pre-charge operation using the method of FIG. 13.

Referring now to FIGS. 13-14, a method 600 of operating the pre-charge circuit 402 within the disconnect 200 is depicted. The method 600 can be performed by the controller 316, for example. The method 600 begins at step 602, where the ignition to the refuse vehicle 10 is off and the ignition to the refuse vehicle 10 has been off for a specified time period. In some examples, the specified time period for the refuse vehicle 10 to be "off" is about thirty seconds or more. Similarly, at step 602, the pre-charge circuit 402 is deactivated, such that no pre-charge is being provided.

At step 604, the ignition to the refuse vehicle 10 is turned on. Accordingly, at step 604, the ignition is on and the ignition to the refuse vehicle 10 has no longer been off for a specified time period. The pre-charge circuit 402 is then charged for a set time interval, so as to fully energize the pre-charge circuit 402. In some examples, the time allowed for the pre-charge circuit 402 to energize (i.e., the "pre-charge delay") is approximately 2 seconds. At step 604, the controller 316 continues to evaluate whether the pre-charge delay has elapsed, and remains at step 604 until the full pre-charge delay has occurred or the ignition is turned off. If the ignition is turned off, the method returns to step 602.

If the ignition remains on and the pre-charge delay has elapsed, the controller 316 advances to step 606. If the disconnect 200 is in the closed position and the negative high voltage contactor 308 is open, a pre-charge timer is set to 0. A pre-charge output is turned on and the pre-charge circuit is fully activated. The controller 316 continues to monitor a status of the pre-charge circuit 402 at step 606 to ensure that appropriate electrical properties are observed. If the ignition is turned off, the disconnect 200 is opened during this step, or the pre-charge timer exceeds a maximum allotted time (e.g., exceeds a timeframe of 10 seconds, for example), the controller 316 deactivates the pre-charge circuit and returns to step 602.

If the controller 316 determines that the pre-charge timer exceeds the maximum allotted time or the pre-charge output is turned off at step 606 before completing the pre-charging process, the controller 316 proceeds to step 608, and issues a failure signal. The failure signal can take a variety of forms and can prevent the battery assembly 23 from being coupled with the E-PTO system 100. In some examples, the controller 316 can issue an alert to a user within the cab 18 that the E-PTO system 100 cannot be coupled with the battery assembly 23. In still other examples, an alarm within the cab 18 is triggered. The controller 316 then returns to step 602.

If the controller 316 continues to observe the pre-charge circuit 402 operating at step 606, the controller 316 will continue to update the pre-charge timer. Once the components within the pre-charge circuit 402 reach a certain charge level, the pre-charge process is considered successful at step 610. For example, in some embodiments, the controller 316 monitors a voltage of the inverter 318. When the inverter 318 reaches a target voltage (e.g., about 550 Volts), and holds that voltage for a specified time period (e.g., 1 second), the pre-charge process is complete, and the E-PTO system 100 is ready to join the battery assembly 23. If, alternatively, the ignition is turned off or the pre-charge output is discontinued at step 610, the method returns to step 602, and the pre-charge circuit is disconnected or otherwise discharged.

If the pre-charging process at step 610 proves successful, the method 600 advances to step 612, shown in FIG. 14. At step 612, the controller 316 begins to initiate the closing process for the negative high voltage contactor 308 to complete the circuit and couple the E-PTO system 100 with the battery assembly 23. As the method advances to step 612, the ignition is on, the access door 206 to the electric power control box 202 is closed, and the disconnect 200 is in the closed position. At step 612, the controller 316 monitors a negative high voltage contactor timer, and counts down incrementally as the voltage within the pre-charge circuit is supplied to the negative high voltage contactor. In some examples, the negative high voltage contactor timer is initially set to 500 milliseconds, for example. Once the negative high voltage contactor timer reaches 0 (meaning pre-charge has been sufficiently supplied), the controller performs a negative high voltage contactor check at step 614.

If, at step 614, the controller 316 determines that the negative high voltage contactor 308 is still open, the method advances to step 616, where the negative high voltage contactor 308 closing process fails. The controller 316 determines the process has failed and can issue an alert or warning that the coupling process has not been completed. In some examples, the negative high voltage contactor 308 output switch is opened as well upon detecting a failure.

If the controller 316 instead determines that the negative high voltage contactor 308 is closed (e.g., by receiving a digital signal, for example), the method advances to step 618. The controller then commands the pre-charge circuit 402 to power down and communication between the battery assembly 23 and E-PTO system 100 is completed. In some examples, the controller 316 continues to monitor the negative high voltage contactor 308 after coupling has been completed, as if the contactor opens, the process will fail and the method will proceed to step 616. Additionally, the method 600 will return to step 602 at any time during steps 612-618 if the access door 206 of the electric power control box 202 is opened, the manual disconnect 200 is moved to the open position, the negative high voltage contactor 308 is opened, or a motor on command is canceled. If such situations are detected, the negative high voltage contactor 308 will be disconnected such that no electrical power will be transmitted from the battery assembly 23 and the negative high voltage contactor 308. In some examples, the controller 316 further monitors a negative high voltage contactor 308 enable signal, which is monitored during steps 612-618 of the method 600.

Using the previously described systems and methods, a refuse truck can be effectively outfitted with an E-PTO system that can convert electrical power to hydraulic power to provide pressurized hydraulic fluid to various subsystems on the vehicle. The E-PTO system includes a disconnect that allows the E-PTO system to be decoupled from the battery of the refuse truck so that the vehicle can be operated in a low power mode that allows the vehicle to drive while the lifting system, compactor, and/or other hydraulic systems are disabled. The disconnect can lock out the E-PTO system so that the E-PTO system is disconnected from any electrical power sources that might otherwise cause the inverter, electrical motor, or helical gear pump to operate during a maintenance procedure. The disconnect can be a manual switch that can be readily accessed by a user to couple or decouple the E-PTO system from the battery of the vehicle.

Figure 15:
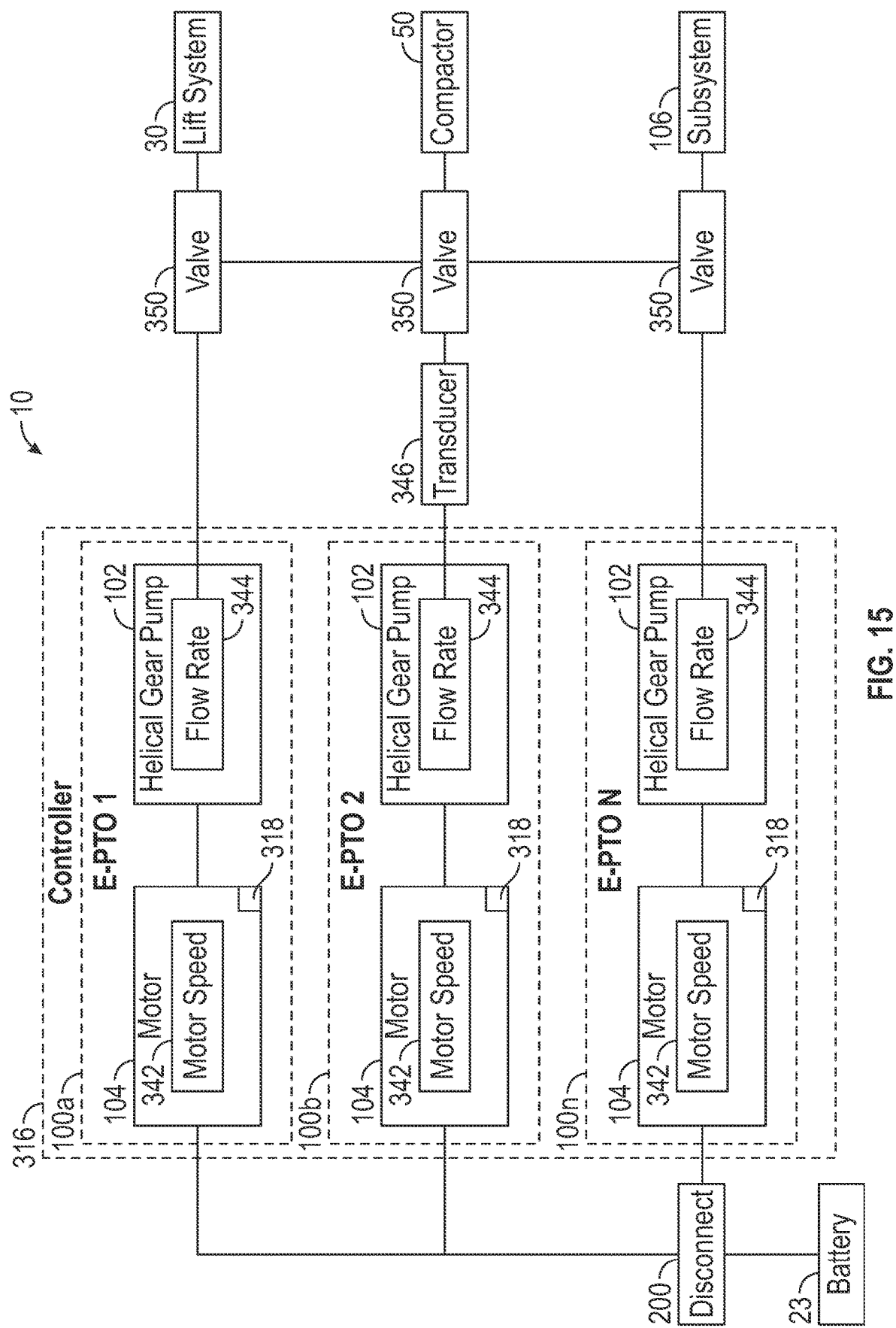
FIG. 15 is a schematic view of another control system that can be incorporated into any of the refuse vehicles of FIGS. 1-3.
Figure 16:
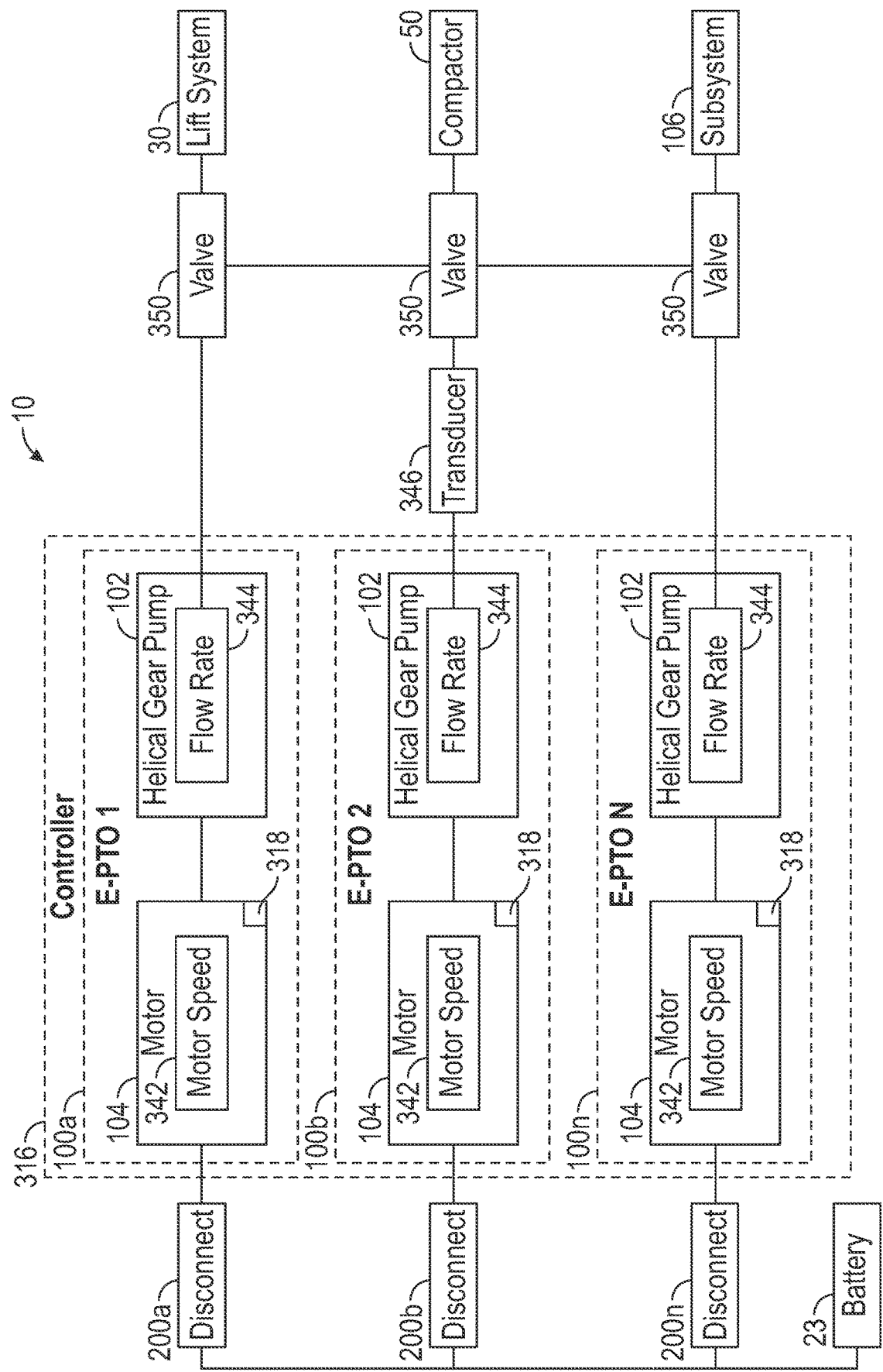
FIG. 16 is a schematic view of another control system that can be incorporated into any of the refuse vehicles of FIGS. 1-3.

Referring now to FIG. 15-16, the refuse vehicle 10 can include multiple E-PTOs 100a, 100b, 100n such that the truck includes several distinct hydraulic circuits that are independently operable to control one of the lift system 30, compactor 50, and/or subsystems 106. For example, a distinct and separate E-PTO 100a can be provided for the lift system 30, while an independently operable E-PTO 100b is provided for the compactor 50. Separate hydraulic fluid reservoirs can be provided for each separate hydraulic circuit. The additional E-PTOs can help provide a more controllable and easier-to-maintain refuse vehicle 10.

Referring to FIG. 15, a schematic of an alternative refuse vehicle 10 is provided. The refuse vehicle 10 generally includes a charge storing device, shown as battery assembly 23, which is configured to provide power to the prime mover 20 to drive the refuse vehicle. The battery assembly 23 is further configured to provide power to one or more E-PTOs 100a, 100b, 100n. The E-PTOs 100a, 100b, 100n, as discussed above, each include an electric motor 104 that is configured to drive one or more helical gear pumps 102 to provide pressurized hydraulic fluid to different systems on the refuse vehicle 10.

The E-PTOs 100a, 100b, 100n are operably coupled to the controller 316. As discussed above, the controller 316 is configured to manage the vehicle 10. More specifically, the controller 316 is configured to manage subsystems of the vehicle 10 (e.g., lift system 30, compactor 50, subsystems 106, etc.). The controller 316 may further manage systems within the E-PTOs 100a, 100b, 100n. For example, the controller 316 may be configured to manage an output of the electric motor 104 and/or the helical gear pump 102.

The electric motors 104 present within each E-PTO 100a, 100b, 100n are configured to draw electricity from the battery assembly 23. As depicted in FIG. 15, each E-PTO 100a, 100b, 100n can include an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318.

The electric motors 104 are configured to output a motor speed 342 (e.g., a first motor speed, a second motor speed, a third motor speed, etc.). The motor speed 342 may be an output speed of shafts, where the shafts coupled to the helical gear pump 102. Accordingly, the motor speed 342 determines a rotational speed of the helical gears positioned within the helical gear pump 102. The electric motors 104 may be operably coupled to the controller 316, where the controller 316 provides a command to actuate the electric motors 104 at a particular motor speed 342. As discussed in greater detail below, the particular motor speed 342 may be dependent upon hydraulic power requirements (e.g., flow rate, pressure, etc.).

Similarly, the helical gear pump 102 may include a flow rate 344. The flow rate 344 may be a flow rate of the pressurized fluid flowing through the helical gear pump 102. The helical gear pump 102 may be directly coupled to the electric motor 104 where the motor speed 342 directly changes the flow rate 344 (e.g., up to a first maximum flow rate, up to a second maximum flow rate, etc.). The helical gear pump 102 may further be operably coupled to the controller 316. As such, the controller 316 may determine a pressure of the fluid needed to run the vehicle subsystem (e.g., lift system 30, compactor 50, subsystem 106, etc.) and send a command to the electric motor 104 to produce a motor speed 342 that would output a flow rate 344 as needed to the vehicle subsystem. In other embodiments, the controller 316 may send a singular command to the electric motor 104. In other embodiments, the controller 316 may continuously send commands to the electric motor 104 with real-time changes of the vehicle subsystem. In some embodiments, multiple helical gear pumps 102 may each include a different flow rate 344 (e.g., a first flow rate, a second flow rate, a third flow rate, etc.)

As depicted, the first E-PTO 100a is configured to supply pressurized fluid to control the lift system 30. Accordingly, the electric motor 104 and helical gear pump 102 can each be better optimized to meet the hydraulic power requirements of the lift system 30, as less overall hydraulic power is needed (in comparison to a single helical gear pump providing hydraulic power to the entire refuse vehicle 10). The cost and complexity of electric motors 104 and helical gear pumps 102 increases significantly as the size of these components increases, such that providing a hydraulically independent E-PTO 100a specifically for the lift system 30 can result in significant cost savings for the refuse vehicle 10. In some examples, multiple of the helical gear pumps 102 can be drive by a common electric motor 104 via a dual shaft or transmission arrangement.

Similarly, the second E-PTO 100b is configured to supply pressurized hydraulic fluid to control the operation of the compactor 50 onboard the refuse vehicle 10. As depicted in FIG. 15, the second E-PTO 100b includes its own dedicated electric motor 104 and helical gear pump 102 that are configured to receive electric power from the battery assembly 23 and convert the received electric power into hydraulic power for use within the compactor 50. In some examples, the first E-PTO 100a and second E-PTO 100b operate fluidly independent of one another, such that a malfunction or deactivation within the electric motor 104 within the second E-PTO 100b will not impact or otherwise affect the operation of the electric motor 104 within the first E-PTO 100a. In other examples, the first E-PTO 100a and second E-PTO 100b can be selectively fluidly independent of one another. For example, valving (e.g., one or more solenoid valves 350) within the refuse vehicle 10 can selectively couple the helical gear pump 102 of the second E-PTO 100b into fluid communication with the hydraulic circuit associated with the lift system 30. Accordingly, if the electric motor 104 or helical gear pump 102 of the first E-PTO 100a experience issues, the second E-PTO 100b can be fluidly coupled with the lift system 30, such that operation of the lift system 30 can continue. In some examples, the second E-PTO 100b can be configured to supply hydraulic power to each of the lift system 30 and the compactor 50 simultaneously. In other embodiments, the second E-PTO 100b may first be fluidly decoupled from the compactor 50 before coupling the second E-PTO 100b with the lift system 30. As explained in additional detail below, each of the E-PTOs 100a, 100b, 100n may be selectively fluidly coupled with any of the lift system 30, compactor 50, or subsystems 106 in some embodiments, depending on the arrangement and positioning of the valves 350.

The second E-PTO 100b may include a pressure transducer, shown as transducer 346. The transducer 346 is positioned between the helical gear pump 102 and the solenoid valves 350. In other embodiments, the transducer 346 may be positioned between at another location in the control system. The transducer 346 may be operably coupled to at least the solenoid valves and the compactor 50. In other embodiments, the transducer 346 is further operably coupled to the controller 316 or the E-PTO 100b. In yet other embodiments, the transducer 346 is operably coupled between the motor 104 and the helical gear pump 102. In yet other embodiments, the transducer 346 is operably coupled between the disconnect 200 and the motor 104. The transducer 346 may be configured to determine a status of the compactor 50. The status may be an actuating status of the compactor 50, a condition of the compactor 50, or the like. As such, the transducer 346 may provide a data to the solenoid valve 350 (e.g. a pressure data point, etc.) to control the flow of pressurized fluid delivered to the compactor 50. For example, the transducer 346 may determine that the compactor 50 is beginning to stall out (e.g., at a predetermined pressure limit, etc.), and provide feedback to the solenoid valve 350 to limit the flow of pressurized fluid delivered to the compactor 50. In another example, the transducer 346 may determine that the compactor 50 has actuated and provide feedback to the solenoid valve 350 to increase the flow of pressurized fluid delivered to the compactor 50. Advantageously, the transducer 346 can control the flow of pressurized fluid unnecessarily delivered to the compactor 50 to limit an amount of wasted energy supplied. That is, the transducer 346 helps improve efficiency within the vehicle 10 by eliminating an unused amount of pressurized fluid through the helical gear pump 102.

In some examples, additional E-PTOs 100n can be included within the system to provide hydraulic power to additional subsystems 106 within the refuse vehicle 10. For example, and as explained above, the additional subsystems 106 can include hydraulics used to operate the tailgate 26, hydraulics used to operate a roof panel, or other hydraulically-powered systems on a refuse vehicle 10. The various different subsystems 106 can be supplied with hydraulic power from the electric motor 104 and helical gear pump 102 of one or more E-PTOs 100n. The electric motor 104 is once again supplied with electrical power from the battery assembly 23, which can be first routed through the inverter 318 and/or VFD within the inverter 318 to convert the electrical power stored within the battery assembly 23 into AC electrical power for use within the electric motor 104.

Each of the E-PTOs 100a, 100b, 100n can be configured to convert electrical power received from the battery assembly 23 into hydraulic power that can be used to operate the various hydraulic cylinders and other hydraulics present aboard the refuse vehicle 10. Because each of these E-PTOs 100*a*, 100*b*, 100*n* operates using electrical power received from the battery assembly 23, a single disconnect 200 can be used to selectively electrically connect each of the E-PTOs 100*a*, 100*b*, 100*n* to the battery assembly 23 and to a power source on the frame 12. As explained above with respect to FIGS. 6-10, the disconnect 200 can be operated manually to decouple each of the E-PTOs 100*a*, 100*b*, 100*n* from the battery assembly 23. The inclusion of a disconnect 200, as discussed above, can be helpful in maintenance situations where lockout/tag out procedures are being used. Similarly, the inclusion of a disconnect 200 can be helpful in reducing the power consumption of the body 14 when the battery assembly 23 is operating in a low or reduced power state.

Referring to FIG. 16, another arrangement for the refuse vehicle 10 is provided. The refuse vehicle 10 is arranged similar to the refuse vehicle 10 depicted in FIG. 15, but includes a separate and dedicated disconnect 200*a*, 200*b*, 200*n* for each E-PTO 100*a*, 100*b*, 100*n*. The disconnects 200*a*, 200*b*, 200*n* can be associated with the E-PTOs 100*a*, 100*b*, 100*n* such that individual hydraulic systems aboard the refuse vehicle 10 can be selectively decoupled from the battery assembly 23 for maintenance or lower power operation. For example, if the battery assembly 23 is in a lower power setting, an operator could use the disconnect 200*b* to electrically decouple the second E-PTO 100*b* from the battery assembly 23, so as to cease operation of the compactor 50. This may be advantageous in lower power situations, as the compactor 50 can often require the greatest forces to operate, which in turn creates the largest electrical power draw from the battery assembly 23. Using the disconnect 200*b* to decouple the second E-PTO 100*b* from the battery assembly 23 can help to save energy in situations where a final set of stops are being performed before completing the route, where operation of the compactor 50 is not critical. The inclusion of multiple disconnects 200*a*, 200*b*, 200*n* can also facilitate maintenance procedures, as less equipment needs to be taken offline to service specific components.

Including multiple E-PTOs 100*a*, 100*b*, 100*n* on a single refuse vehicle 10 can provide a number of advantages, as explained above. For example, providing each hydraulic component with its own dedicated electric motor 104 and helical gear pump 102 can allow the use of smaller and less expensive motors and pumps, which can reduce the overall cost of the refuse vehicle 10, while also making the refuse vehicle 10 easier to maintain. Further, the use of independent hydraulic circuits can allow for more precise control of the helical gear pump 102 and electric motor 104, to provide the individual vehicle subsystems with the necessary pressure.

As explained above, the multiple E-PTOs 100*a*, 100*b*, 100*n* can be arranged to operate completely independent of one another or can be selectively fluidly coupled together using the valves 350. In some examples, the valves 350 are solenoid-operated valves that are in communication with the controller 316. The controller 316 can then monitor operation of the various E-PTOs 100*a*, 100*b*, 100*n* and can selectively create fluid communication between different hydraulic circuits on the refuse vehicle 10 in response to detecting certain events occurring within the refuse vehicle 10. For example, if the controller 316 receives an indication that the electric motor 104 within the second E-PTO 100*b* is malfunctioning or damaged, the controller 316 can open one or more of the valves 350 to provide pressurized hydraulic fluid to the compactor 50 from the first E-PTO 100*a* or an additional E-PTO 100*n*. Because multi-position valves 350 are provided between each of the E-PTOs 100*a*, 100*b*, 100*n* and their associated loads, the refuse vehicle 10 can react to failure conditions occurring on the refuse vehicle 10 in real-time to maintain the performance of the refuse vehicle 10. In normal operation, however, each of the E-PTOs 100*a*, 100*b*, 100*n* operate independently. Additionally, the inclusion of separate and distinct disconnects 200*a*, 200*b*, 200*n* for each E-PTO 100*a*, 100*b*, 100*n* allows for subsets of electrical equipment to be decoupled from the battery assembly 23 without sacrificing the overall functionality of the refuse vehicle 10. This functionality can allow the overall refuse vehicle 10 to react and adapt to malfunctions within equipment in near-real time. In some examples, the controller 316 is configured to communicate an alarm and instructions to an operator to manually adjust a position of the disconnect 200 in response to detecting a failure within one of the E-PTOs 100*a*, 100*b*, 100*n*. Accordingly, damaged equipment can be readily taken offline and further damage to the equipment can be avoided, reducing the number of costly repairs.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and disconnect in isolation and incorporated into any type or variation of refuse vehicle.

Additionally, the manual disconnect 200 discussed herein can be incorporated to selectively permit or block power transfer between systems other than the battery assembly 23 and the E-PTO system 100. For example, and as depicted in FIG. 11, a disconnect 200 can be incorporated into a front-end loader (FEL) carry can 500. In some examples, the carry can 500 is configured to draw electrical power from the battery assembly 23 using a wired connection or other coupling that creates electrical communication between the battery assembly 23 and the carry can 500. The electricity supplied from the battery assembly 23 to the carry can 500 can be used to operate the various lifting systems and other subsystems that may be present on the carry can 500. The disconnect 200 can selectively control and influence electrical communication that may otherwise occur through the forks 34 and the carry can 500 or through other wired connections that may normally couple the carry can 500 with the battery assembly 23. The disconnect 200 may be positioned on either of the refuse vehicle 10 or on the carry can 500 in a location that permits manual actuation. In some examples, the carry can 500 includes its own onboard energy storage device 502 (e.g., a battery, etc.) that can be used to operate the carry can 500 when the carry can is disconnected from the battery assembly 23 using the disconnect 200. Accordingly, the carry can 500 can continue to operate for a period of time even when no power from the battery assembly 23 is being provided. In still other examples, the carry can 500 includes a controller 504 that is configured to detect a status of the two or more power sources coupled with the carry can 500 and power the carry can based upon which power supplies are currently providing power or currently able to provide power to the carry can 500. If electrical power from the battery assembly 23 is available (e.g., the disconnect 200 is not tripped, the battery assembly 23 has available power, etc.) the controller 504 will power the carry can 500 using electrical power from the battery assembly 23. If the disconnect 200 is tripped and the connection between the battery assembly 23 and the carry can 500 is disrupted (or if the battery assembly 23 is in a lower power condition, etc.), the controller 504 will request power from the onboard energy storage device 502. In some examples, the disconnect 200 and/or controller 504 can supply electrical power from the onboard energy storage device 502 to the refuse vehicle 10 and/or the E-PTO system 100 if the battery assembly 23 experiences unexpected failure or is in a low power condition. The disconnect 200 can selectively permit the transfer of electrical power from the carry can 500 to one or both of the battery assembly 23 and the E-PTO system 100 to help drive the vehicle 10.

Figure 17:
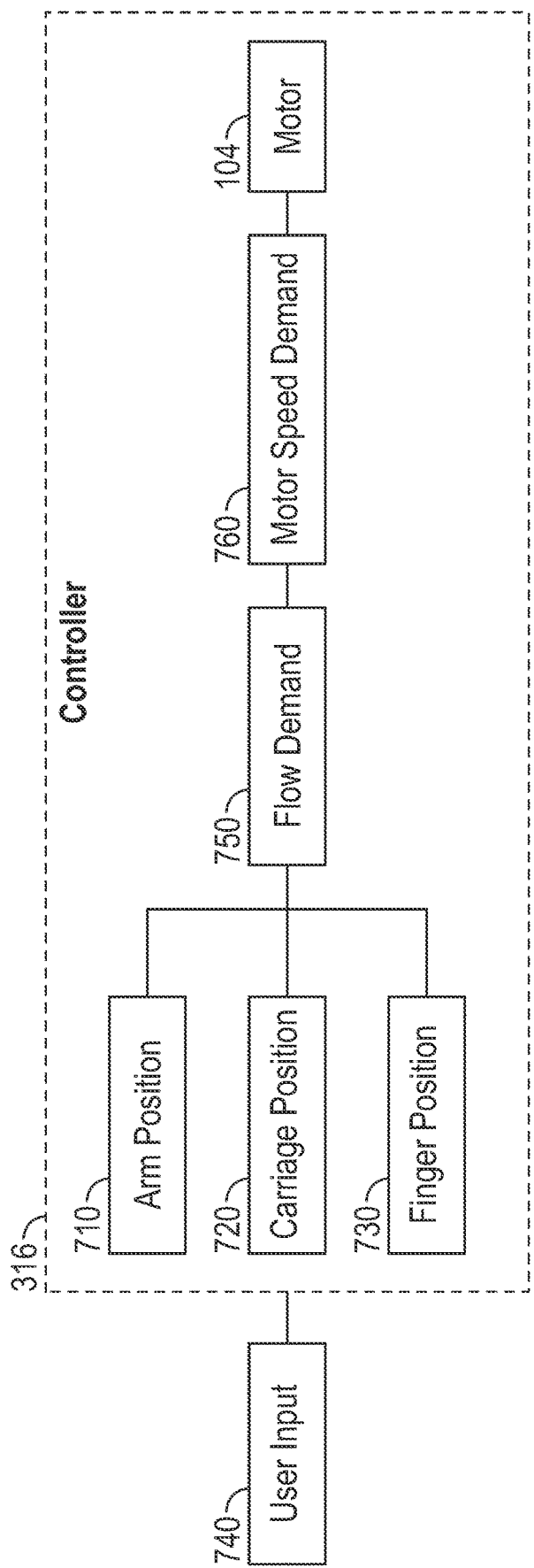
FIG. 17 is a schematic view of a method of lift system and compactor control that can be incorporated into any of the refuse vehicles of FIGS. 1-3.

Referring now to FIG. 17, a control system 700 for controlling the lift system 30. The control system 700 includes the controller 316. The controller 316 is configured to determine the motor speed 342 based on variable controls. The variable controls may be at least one of arm position 710, carriage position 720, and/or finger position 730 (e.g. a first position, a second position, a third position, etc.). The arm position 710 may be a control to move the arm position in or move the arm position out. In some embodiments, the arm position 710 may be a control to raise the arm position or lower the arm position. The carriage position 720 may be a control to raise the carriage or lower the carriage. In some embodiments, the carriage position 720 may be a control to move the carriage in or move the carriage out. The finger position 730 may be a control to move the fingers together or move the fingers apart. In some embodiments, the finger position 730 may be a control to raise the fingers or lower the fingers. By way of example, the controls 710, 720, 730 may be applied over a movement range of 0-100% (e.g. a first movement range, a second movement range, a third movement range etc.) (e.g., to a first maximum position, to a second maximum position, to a third maximum position, etc.).

The controls 710, 720, 730 may be operable via a user input 740 (e.g. a first user input, a second user input, a third user input, etc.). The user input 740 may be a joystick, where an operator moves the joystick to control the lift system 30. In some embodiments, the user input 740 may be more than one joystick, where each joystick is operable coupled to one of the controls 710, 720, 730. In other embodiments, the user input 740 may be an alternative component from a joystick (e.g., button, steering wheel, etc.). The user input 740 may be operably coupled to the controller 316, where the user may provide a command to the controller 316 via the user input. For example, the user may interface with the user input 740 to send a command to the controller 316 to move the arm position 710. In another example, the user may interface with the user input 740 to send a command to the controller 316 to move the arm position 710 and the finger position 730. By way of example, the user input 740 can control any combination of the controls 710, 720, 730.

The controls 710, 720, 730 may be movements of the lift system 30 that require a flow of pressurized fluid, shown as flow demand 750. The flow demand 750 may be a flow rate of the helical gear pump 102 that is needed to meet the movement of the lift system 30. The controls 710, 720, 730 may be input variables to the flow demand 750, where each individual or combination of controls 710, 720, 730 requires a variable flow demand 750. Additionally or alternatively, the rate of the individual controls 710, 720, 730 (e.g., 0-100%, etc.) further controls the flow demand 750. For example, 50% load of arm positon 710 and 85% load of carriage position 720 may require a different flow demand 750 compared to 10% load of carriage position 720 and 90% load of finger position 730. As can be appreciated, the flow demand 750 varies based on the combination and loading of the controls 710, 720, 730 (e.g., a first flow demand, a second flow demand, a third flow demand, etc.). Accordingly, the flow demand 750 may be a max flow rate of the helical gear pump.

Although the control system 700 has been described within the context of a helical gear pump, the same or similar systems can also be included for any type of pump that produces pressurized fluid.

Knowing the flow demand 750, the controller 316 can further determine a motor speed demand 760 that is needed to meet the flow demand 750. The motor speed demand 760 may be an output from the flow demand 750 and a helical gear pump size. As can be appreciated, the larger the pump size may require less motor speed demand 760 to meet the flow demand 750. In other embodiments, the larger the pump size may require raising the motor speed demand 760 to meet the flow demand 750. The motor speed demand 760 is then communicated to the electric motor 104, where the electric motor 104 can output as needed. Both the flow demand 750 and motor speed demand 760 may be real time demands, where the control system 700 is constantly actuating to ensure that the lift system 30 is receiving sufficient pressurized fluid.

Although the description of the control system 700 has been described within the context of the lift system 30, the same or similar systems can also be included in both the compactor 50 and the subsystem 106. Accordingly, the disclosure should be considered to encompass the controller in isolation and incorporated into any type or variation of refuse vehicle or system.

Figure 18:
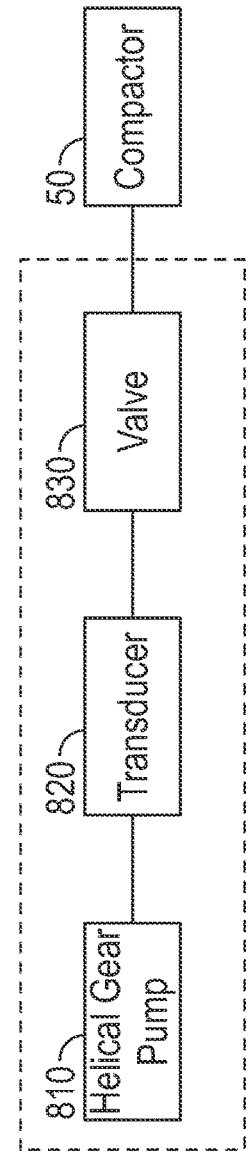
FIG. 18 is a schematic view of a compactor control system that can be incorporated into any of the refuse vehicles of FIGS. 1-3.

Referring now to FIG. 18, a schematic view of a control system 800 for the compactor 50 is shown, according to another exemplary embodiment. The control system 800 may be substantially similar to the control system shown in FIGS. 15 and 16, and, as such, like components may be used to describe the control system 800. The control system 800 includes a helical gear pump 810. The helical gear pump 810 is configured substantially similar to the helical gear pump 102. The control system 800 further includes a transducer 820. The transducer 820 is configured substantially similar to the transducer 346. The control system 800 further includes a valve 830. The valve 830 is configured substantially similar to the valve 350. The control system 800 has a similar construction to the control system described in the control system shown in FIGS. 15 and 16, thus the description of relevant components in FIG. 15 and FIG. 16 are recited here as if reiterated in full.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, the refuse vehicle comprising:
   a chassis;
   a body coupled to the chassis, the body defining a collection chamber configured to receive refuse therein;
   a lift system coupled to the body, the lift system including:
   a lift arm actuator;
   a first pump configured to power the lift arm actuator;
   a first electric motor coupled to the first pump and configured to drive the first pump; and
   a controller communicably coupled to the first electric motor, the controller configured to:
   receive a first user input that specifies a first position of the lift arm actuator within a first movement range;
   determine a first flow demand required to move the lift arm actuator to the first position based on the first user input;
   determine a first motor speed of the first electric motor that satisfies the first flow demand; and
   communicate the first motor speed to the first electric motor.

2. The refuse vehicle of claim 1, wherein the first pump is configured as a helical gear pump.

3. The refuse vehicle of claim 1, wherein the lift system includes a carriage actuator, the first pump is further configured to power the carriage actuator, and the controller is further configured to:
   receive a second user input that specifies the first position of the lift arm actuator within the first movement range and a second position of the carriage actuator within a second movement range
   determine a second flow demand required to move the lift arm actuator to the first position and the carriage actuator to the second position based on the second user input;
   determine a second motor speed of the first electric motor that satisfies the second flow demand; and
   communicate the second motor speed to the first electric motor.

4. The refuse vehicle of claim 3, wherein the lift system includes finger actuator, the first pump is further configured to power the finger actuator, and the controller is further configured to:
   receive a third user input that specifies the first position of the lift arm actuator within the first movement range, the second position of the carriage actuator within the second movement range, and a third position of the finger actuator within a third movement range;
   determine a third flow demand required to move the lift arm actuator to the first position, the carriage actuator to the second position, and the finger actuator to the third position based on the third user input;
   determine a third motor speed of the first electric motor that satisfies the third flow demand; and
   communicate the third motor speed to the first electric motor.

5. The refuse vehicle of claim 4, wherein a first maximum flow rate of the first pump is equivalent to the third flow demand required to move the lift arm actuator to a first maximum position of the first movement range, the carriage actuator to a second maximum position of the second movement range, and the finger actuator to a third maximum position of the third movement range.

6. The refuse vehicle of claim 1, the refuse vehicle further comprising:
   a compactor positioned inside of the collection chamber, the compactor including:
   a compactor actuator;
   a second pump configured to power the compactor actuator; and
   a second electric motor coupled to the second pump, configured to drive the second pump and communicably coupled to the controller;
   the controller further configured to:
   receive a second user input that specifies a second position of the compactor actuator within a second movement range;

determine a second flow demand required to move the compactor actuator to the second position based on the second user input;
determine a second motor speed of the second electric motor that satisfies the second flow demand; and
communicate the second motor speed to the second electric motor.

7. The refuse vehicle of claim 6, wherein a first maximum flow rate of the first pump is equivalent the first flow demand required to move the lift arm actuator to a first maximum position of the first movement range and a second maximum flow rate of the second pump is equivalent to the second flow demand required to move the compactor actuator to a second maximum position of the second movement range.

8. The refuse vehicle of claim 6, wherein the compactor includes a pressure transducer fluidly coupled between the compactor actuator and the second pump, configured to record a pressure data point, and communicably coupled to the controller and the controller is further configured to:
receive the pressure data point from the pressure transducer;
determine if the pressure data point is above a predetermined pressure limit;
if the pressure data point is above the predetermined pressure limit, determine a third flow demand required to decrease the pressure data point;
determine a third motor speed of the second electric motor that satisfies the third flow demand; and
communicate the third motor speed to the second electric motor.

9. The refuse vehicle of claim 6, the refuse vehicle further comprising a valve fluidly coupled between the lift system and the compactor, configured to fluidly couple the lift system and the compactor when open, and configured to separate the lift system and the compactor when closed.

10. The refuse vehicle of claim 9, wherein the controller is further configured:
receive a third user input that specifies to open or close the valve; and
communicate to the valve to open or close.

11. A control system of a refuse vehicle, the control system comprising:
a first pump configured to produce a pressurized fluid;
a first electric motor coupled to the first pump and configured to drive the first pump;
a first hydraulic subsystem fluidly coupled to the first pump, the first hydraulic subsystem including:
a first actuator, the first actuator having a first movement range;
a controller communicably coupled to the first electric motor, the controller configured to:
receive a first user input that specifies a first position of the first actuator within the first movement range;
determine a first flow demand required to move the first actuator to the first position based on the first user input;
determine a first motor speed of the first electric motor that satisfies the first flow demand; and
communicate the first motor speed to the first electric motor.

12. The control system of claim 11, wherein the first pump is a helical gear pump.

13. The control system of claim 11, the control system further comprising:
a second pump fluidly coupled to the first hydraulic subsystem and configured to produce a second flow rate of the pressurized fluid; and
a second electric motor coupled to the second pump and configured to drive the second pump, the controller further configured to:
determine the first motor speed and a second motor speed required to meet the first flow demand; and
communicate the first motor speed to the first electric motor and the second motor speed to the second electric motor.

14. The control system of claim 11, the control system further comprising:
a second hydraulic subsystem fluidly coupled to the first pump, the second hydraulic subsystem including:
a second actuator, the second actuator having a second movement range;
the controller further configured to:
receive a second user input that specifies the first position of the first actuator within the first movement range and a second position of the second actuator within the second movement range
determine a second flow demand required to move the first actuator to the first position and the second actuator to the second position based on the second user input;
determine a second motor speed of the first electric motor that satisfies the second flow demand; and
communicate the second motor speed to the first electric motor.

15. The control system of claim 14, the control system further comprising a valve fluidly coupled between the first hydraulic subsystem and the second hydraulic subsystem, configured to fluidly couple the first hydraulic subsystem and the second hydraulic subsystem when open, and configured to separate the first hydraulic subsystem and the second hydraulic subsystem when closed.

16. The control system of claim 11, wherein the first hydraulic subsystem includes a second actuator having a second movement range and the controller is further configured to:
receive a second user input that specifies the first position of the first actuator within the first movement range and a second position of the second actuator within the second movement range
determine a second flow demand required to move the first actuator to the first position and the second actuator to the second position based on the second user input;
determine a second motor speed of the first electric motor that satisfies the second flow demand; and
communicate the second motor speed to the first electric motor.

17. The control system of claim 11, wherein the first hydraulic subsystem includes a pressure transducer fluidly coupled between the first actuator and the first pump, configured to record a pressure data point, and communicably coupled to the controller; and
the controller is further configured to:
receive the pressure data point from the pressure transducer;
determine if the pressure data point is above a predetermined pressure limit;
if the pressure data point is above the predetermined pressure limit, determine a second flow demand required to decrease the pressure data point;
determine a second motor speed of the first electric motor that satisfies the second flow demand; and
communicate the second motor speed to the first electric motor.

18. A method, the method comprising:
receiving a first user input that specifies a first position of a lift arm actuator of a refuse vehicle within a first movement range;
determining a first flow demand required to move the lift arm actuator to the first position based on the first user input;
determining a first motor speed of a first electric motor coupled to a first pump and configured to drive the first pump that satisfies the first flow demand; and
communicating the first motor speed to the first electric motor.

19. The method of claim 18, the method further comprising:
receiving a second user input that specifies the first position of the lift arm actuator within the first movement range and a second position of a carriage actuator of the refuse vehicle within a second movement range;
determining a second flow demand required to move the lift arm actuator to the first position and the carriage actuator to the second position based on the second user input;
determining a second motor speed of the first electric motor that satisfies the second flow demand; and
communicating the second motor speed to the first electric motor.

20. The method of claim 18, the method further comprising
receiving a second user input that specifies a second position of a compactor actuator of the refuse vehicle within a second movement range;
determining a second flow demand required to move the compactor actuator to the second position based on the second user input;
determining a second motor speed of a second electric motor coupled to a second pump and configured to drive the second pump that satisfies the second flow demand; and
communicating the second motor speed to the second electric motor.

* * * * *